(12) United States Patent
Parthasarathy et al.

(10) Patent No.: US 10,419,448 B2
(45) Date of Patent: Sep. 17, 2019

(54) ENHANCED EMAIL SERVICE

(71) Applicant: Microsoft Technology Licensing, LLC, Redmond, WA (US)

(72) Inventors: Krishna Kumar Parthasarathy, Redmond, WA (US); George E. Roussos, Seattle, WA (US); Hao Zhang, Sammamish, WA (US); Christopher S. Dickens, Issaquah, WA (US); Salil Kapoor, Woodinville, WA (US); Vinh Trinh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 15/603,356

(22) Filed: May 23, 2017

(65) Prior Publication Data

US 2018/0198799 A1    Jul. 12, 2018

Related U.S. Application Data

(60) Provisional application No. 62/444,313, filed on Jan. 9, 2017.

(51) Int. Cl.
*H04L 12/58* (2006.01)
*H04L 29/06* (2006.01)
*G06F 21/62* (2013.01)

(52) U.S. Cl.
CPC ............ *H04L 63/123* (2013.01); *H04L 51/08* (2013.01); *H04L 63/0428* (2013.01);
(Continued)

(58) Field of Classification Search
CPC ............... H04L 63/123; H04L 63/0428; H04L 63/0823; H04L 63/061; H04L 63/0807; H04L 51/08; H04L 51/18; G06F 21/6209
(Continued)

(56) References Cited

U.S. PATENT DOCUMENTS 7,716,467 B1   5/2010 Deffet et al.
7,870,198 B2   1/2011 Graham et al.
(Continued)

FOREIGN PATENT DOCUMENTS

WO    2015080571 A1    6/2015

OTHER PUBLICATIONS

"Office 365 Message Encryption", https://products.office.com/en-us/exchange/office-365-message-encryption, Retrieved on: Dec. 23, 2016, 6 pages.
(Continued)

*Primary Examiner* — Michael S McNally
(74) *Attorney, Agent, or Firm* — Newport IP, LLC; Mike R. Cicero

(57) ABSTRACT

An enhanced email service that mitigates drawbacks of conventional email services by enabling transmission of encrypted content to a recipient regardless of the recipient having a prior relationship with the sender or having credentials issued from a certificate authority. A method is provided for receiving encrypted content and generating a message includes both the encrypted content as an attachment and a link to enable decrypted access to the decrypted content. The method may include transmitting the message to an intended recipient's mailbox while also storing the message in an organizational mailbox to provide for subsequent decryption of the encrypted content. The link may provide the intended recipient of the message with decrypted access to the encrypted content in various ways depending on, for example, whether the recipient is viewing the message through a webmail browser or through a local mail client that is compatible with the enhanced email service.

20 Claims, 15 Drawing Sheets

(52) U.S. Cl.
CPC ...... *H04L 63/0823* (2013.01); *G06F 21/6209* (2013.01); *H04L 51/18* (2013.01); *H04L 63/061* (2013.01); *H04L 63/0807* (2013.01); *H04L 2463/062* (2013.01)

(58) Field of Classification Search
USPC ....................................................... 713/171
See application file for complete search history.

(56) References Cited

U.S. PATENT DOCUMENTS

| | | |
|---|---|---|
| 8,837,739 B1 | 9/2014 | Sexton et al. |
| 9,426,129 B2 | 8/2016 | Dabbiere et al. |
| 2004/0030893 A1* | 2/2004 | Karamchedu ......... G06F 21/606 713/168 |
| 2005/0086533 A1 | 4/2005 | Hsieh |
| 2005/0210246 A1 | 9/2005 | Faure |
| 2008/0028446 A1 | 1/2008 | Burgoyne |
| 2008/0215686 A1 | 9/2008 | Meredith et al. |
| 2010/0217984 A1 | 8/2010 | Hill |
| 2013/0055368 A1* | 2/2013 | Bauckman ............. H04L 51/24 726/7 |
| 2015/0256519 A1 | 9/2015 | Liebmann et al. |
| 2016/0269440 A1* | 9/2016 | Hartman ............. H04L 63/1483 |
| 2016/0308840 A1 | 10/2016 | Munshi et al. |

OTHER PUBLICATIONS

"Define Rules to Encrypt or Decrypt Email Messages", https://technet.microsoft.com/en-us/library/dn569289.aspx, Published on: Jul. 11, 2016, 4 pages.

"Client-Side Data Protection with Virtru Encryption as a Service (EaaS)", In White Paper of Virtru, Dec. 23, 2016, 19 pages.

"International Search Report and Written Opinion Issued in PCT Patent Application No. PCT/US18/012437", dated Mar. 19, 2018, 10 Pages.

* cited by examiner

ENHANCED EMAIL SERVICE

PRIORITY APPLICATION

This application claims the benefit of and priority to U.S. Provisional Application No. 62/444,313, filed Jan. 9, 2017, the entire contents of which are incorporated herein by reference.

BACKGROUND

Currently there are a number of different cryptographic email services available to enable a sender to transmit encrypted message content to a recipient and to provide the recipient with an ability to decrypt the content. Many of these mechanisms have specific advantages and drawbacks to using them. For example, although one such mechanism known as Secure Multipurpose Internet Mail Extensions (S/MIME) may enable a recipient to receive encrypted content and a corresponding key to decrypt the content, the applicability of S/MIME is limited in terms of potential recipients because this standard requires each of the sender and the recipient to obtain credentials from their respective in-house certificate authority (CA) or a public CA before this functionality can be utilized. Due to this limitation, when sending encrypted content outside of an organization, the sender may lack confidence that the recipient will be able to successfully decrypt the content upon receipt because the sender may be unsure of whether the recipient has obtained credentials or will do so if prompted. This concern could be partially mitigated by limiting potential recipients to individuals from within one's own organization (e.g. co-workers with email addresses operating on the same domain) or at least recipients whom are known to have already obtained credentials from a public CA. The clear drawbacks to S/MIME, and other similar cryptographic email services, include limiting the pool of potential recipients to one's own organization and/or requiring recipients to go through the cumbersome process of obtaining credentials from a CA prior to sending encrypted content.

It is with respect to these considerations and others that the disclosure made herein is presented.

SUMMARY

Technologies are described herein for providing an enhanced email service that mitigates drawbacks associated with conventional email services by, for example, enabling transmission of encrypted content to an intended recipient regardless of the intended recipient having a prior relationship with the sender or having obtained credentials from a certificate authority (CA). Generally described, configurations disclosed herein reduce barriers to successfully and confidently transmitting encrypted message content to any recipient email address. According to aspects of the present disclosure, a method is provided for receiving encrypted content and, based thereon, generating a message that designates the recipient email address and includes both the encrypted content as an attachment and a link to enable decrypted access to the encrypted content. The method may also include transmitting the message to the intended recipient's mailbox while also storing the message in an organizational mailbox to enable subsequent decryption of the encrypted content. The link may be configured to provide the intended recipient of the message with decrypted access to the encrypted content in various ways depending on, for example, whether the recipient is viewing the message through a webmail browser or through a local mail client that is compatible with the enhanced email service.

For illustrative purposes, consider a scenario where the recipient of a message that contains encrypted content is viewing the message through a universal mail module (e.g., webmail) that does not have security protocols that are compatible with an enhanced email service (e.g., Office 365). In such a case, a web browser running on the recipient's device may have the webmail module open in a first web domain from which the link is displayed to provide access to the encrypted content. Then, the encrypted content can be accessed via a webpage in a second web domain that exposes an authentication module application programming interface (API) of the intended recipient's mail service, e.g. the second domain may expose an OAuth security module that corresponds to the first domain. The first web domain may be associated with the recipient's mail service (e.g. Gmail™ webmail service, Yahoo® webmail service) while the second web domain may be associated with the enhanced email service (e.g., Office 365). Upon a recipient providing credentials to and receiving a token from the authentication module API, the token may be provided to the enhanced email service. The token can then cause the enhanced email service to locally decrypt the encrypted content on the server side and display it to the recipient in the form of a web page.

Now consider a scenario where the recipient of the same message containing the encrypted content and the link is instead viewing the message through a local mail client that includes enhanced communication abilities with respect to the enhanced email service in the sense that the local mail client is capable of automatically (e.g., without user interaction) providing an authenticator or token obtained from the recipient's mail service to the enhanced email service. An example of a local mail client and an enhanced email service having compatible security protocols (e.g., enhanced communication abilities) can include an Outlook mail client and Office 365 services. In such a case, the local mail client may process the message by automatically sending a token (that is at some point obtained from the recipient's mail service) to the enhanced email service and, in response to verifying the validity of the token, the enhanced email service may provide to the local mail client a key to enable local decryption of the encrypted content, e.g. decryption by the local mail client. The local mail client may then, by use of the obtained key, generate a decrypted version of the content and temporarily store the decrypted content in a volatile cache for seamless display to the recipient. In other words, the recipient may be able to decrypt the content and view the content without having to perform manual inputs to cause the token and key exchange.

The present disclosure provides a number of variations to the above-described concepts. For instance, as will be described in more detail below, a system can include an on-premise mail service in communication with the enhanced email service to provide the intended recipient with decrypted access to encrypted content via the universal mail module without storing the encrypted content on the enhanced mail service. In yet another example, a system can include an enhanced email service that provides decrypted access to encrypted content via the enhanced mail module without storing the encrypted content on the enhanced mail service.

It should be appreciated that the above-described subject matter may also be implemented as a computer-controlled apparatus, a computer process, a computing system, or as an article of manufacture such as a computer-readable medium.

These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 1 illustrates an example data flow scenario of a system that includes an enhanced email service to provide an intended recipient with decrypted access to encrypted content through a universal mail module such as, for example, a web browser that is accessing a webmail service.

FIG. 2A illustrates aspects of a user interface (UI) that can be displayed on a user device in association with the data flow scenario of FIG. 1 to communicate instructions of how to obtain decrypted access of the encrypted content. This UI displays an email message that includes a link to enable the intended recipient to provide credentials associated with their email service provider to the enhanced mail service. As with any UI described herein, this example UI can be displayed on a variety of device types, such as a desktop computer, a laptop computer, a mobile device, a tablet computer, or a combination of devices.

Figure 3:
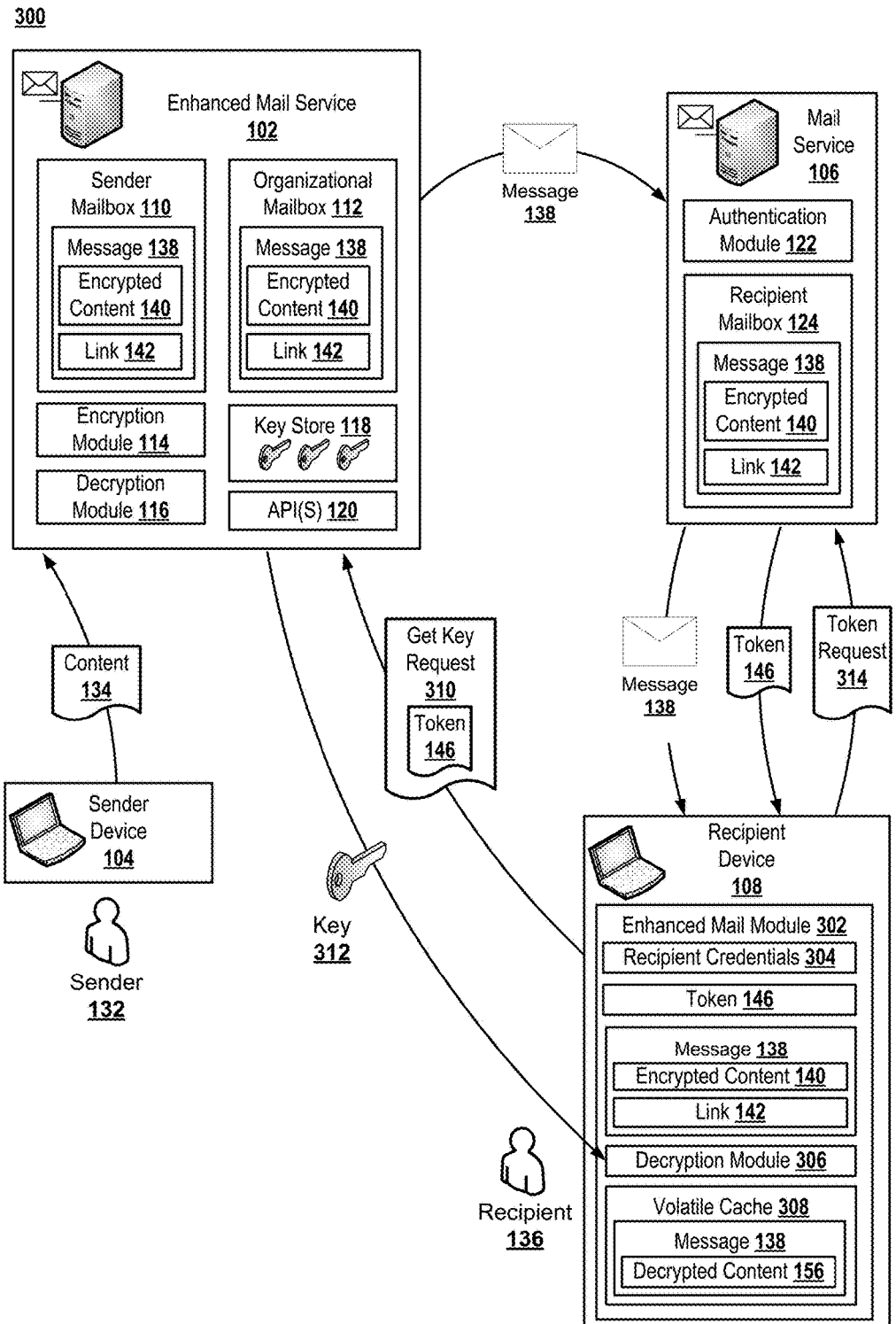

FIG. 3 illustrates an example data flow scenario of a system in which the enhanced email service provides the intended recipient with decrypted access to encrypted content through an enhanced mail module, e.g. a mail module that includes enhanced communication compatibilities with respect to the enhanced mail service. As illustrated, the enhanced mail module may provide a token to the enhanced mail service in exchange for an encryption key that is usable to decrypt the encrypted content.

Figure 4:
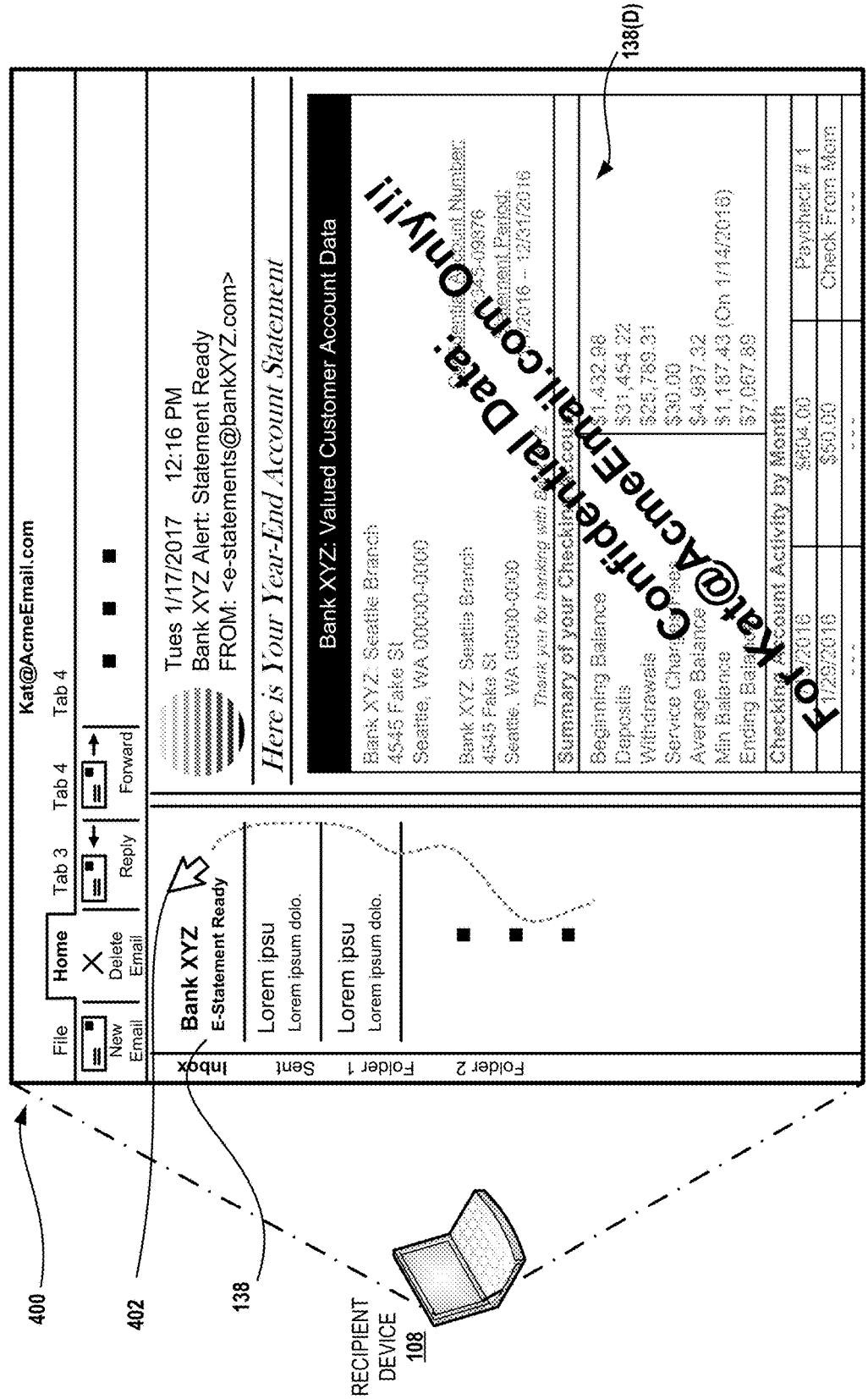

FIG. 4 illustrates aspects of a UI that can be displayed on the user device in association with the data flow scenario of FIG. 3 based on the enhanced mail module obtaining the encryption key to generate a decrypted version of an email message containing encrypted content. As illustrated, the UI may display the decrypted version of the email message through a universal reading pane view of the enhanced mail module.

Figure 5A:
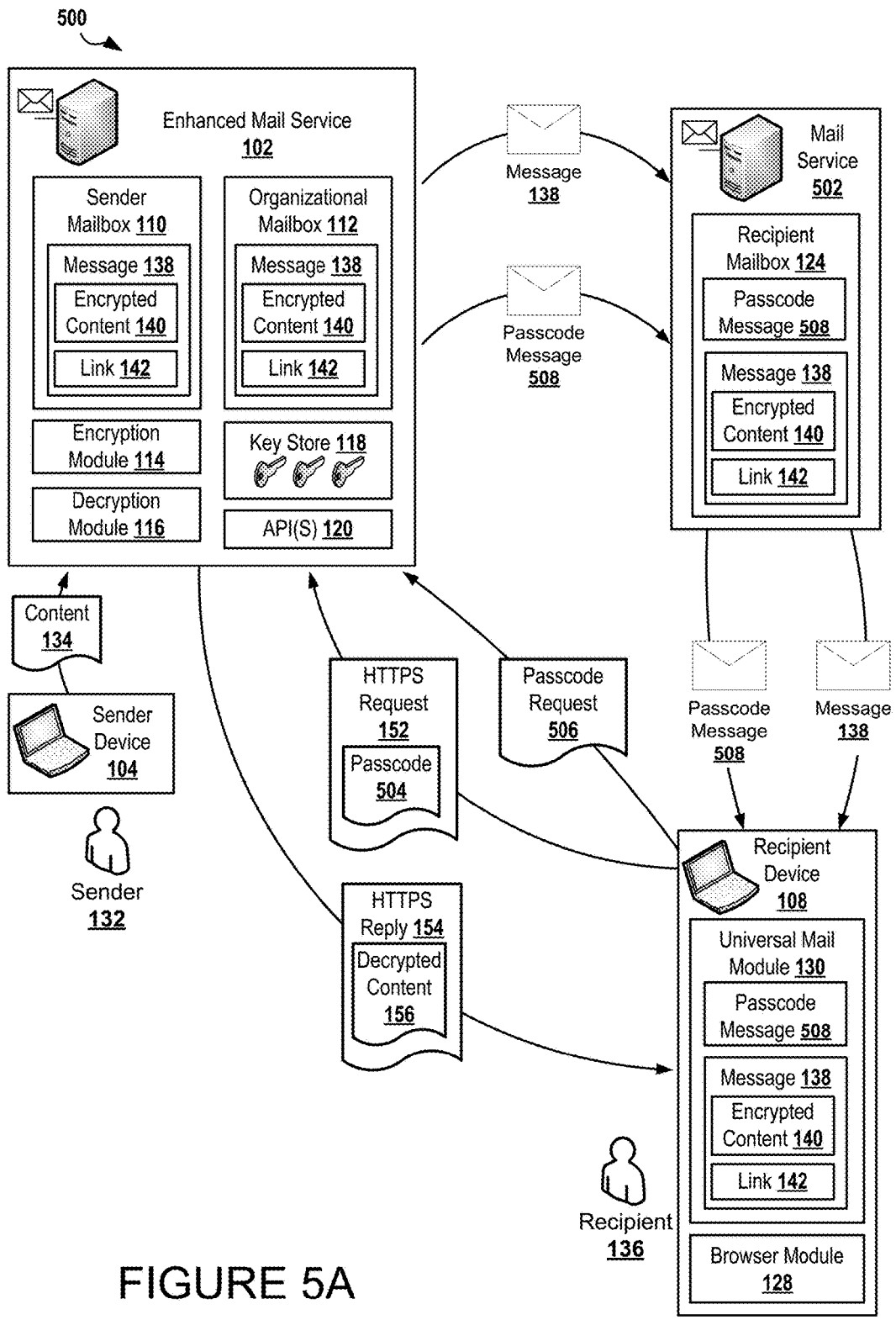

FIG. 5A illustrates an example data flow scenario of a system that includes an enhanced email service to provide an intended recipient with a passcode that is usable to obtain decrypted access to the encrypted content of the email message via the universal mail module.

Figure 5B:
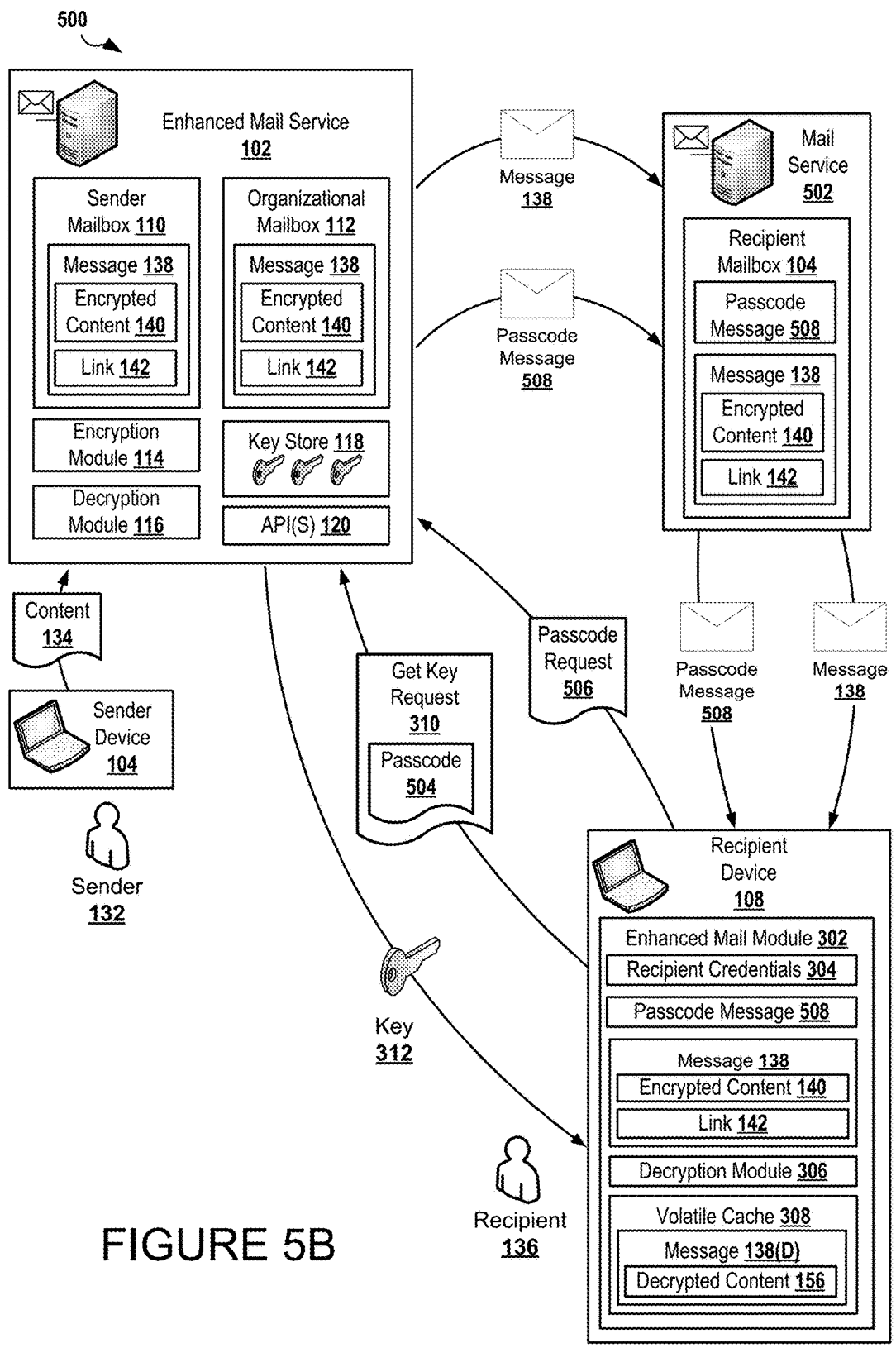

FIG. 5B illustrates an example data flow scenario of a system that includes an enhanced email service to provide an intended recipient with a passcode that is usable to obtain decrypted access to the encrypted content of the email message via the enhanced mail module.

Figure 6:
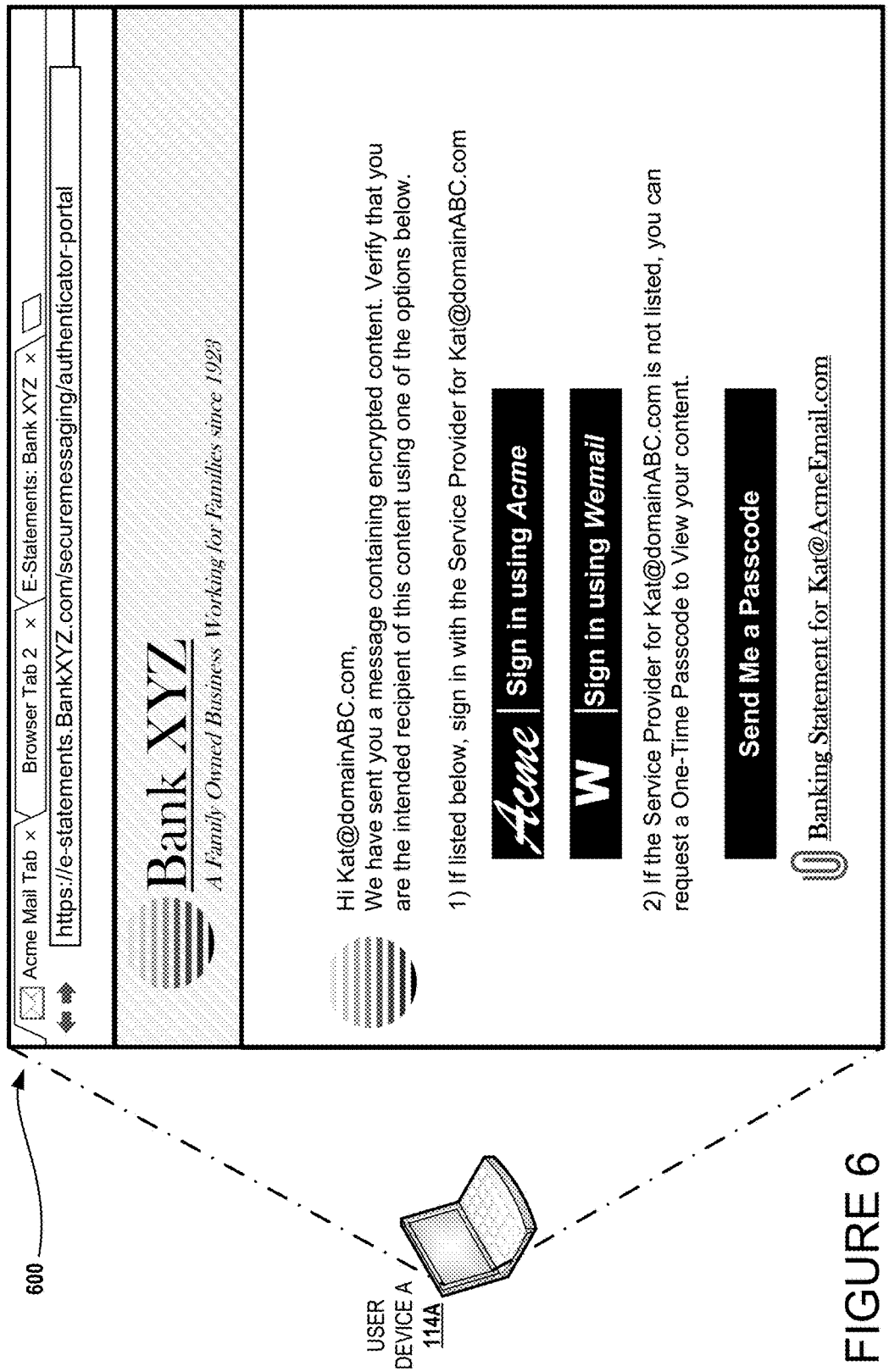

FIG. 6 illustrates aspects of a UI that can be displayed on the user device in association with the data flow scenario of FIG. 5A to enable the user to cause the enhanced mail service to transmit a passcode to the intended recipient's mailbox. As illustrated, the UI may provide the user with options to sign-in with her email service provider (if listed) or request a passcode.

Figure 7A:
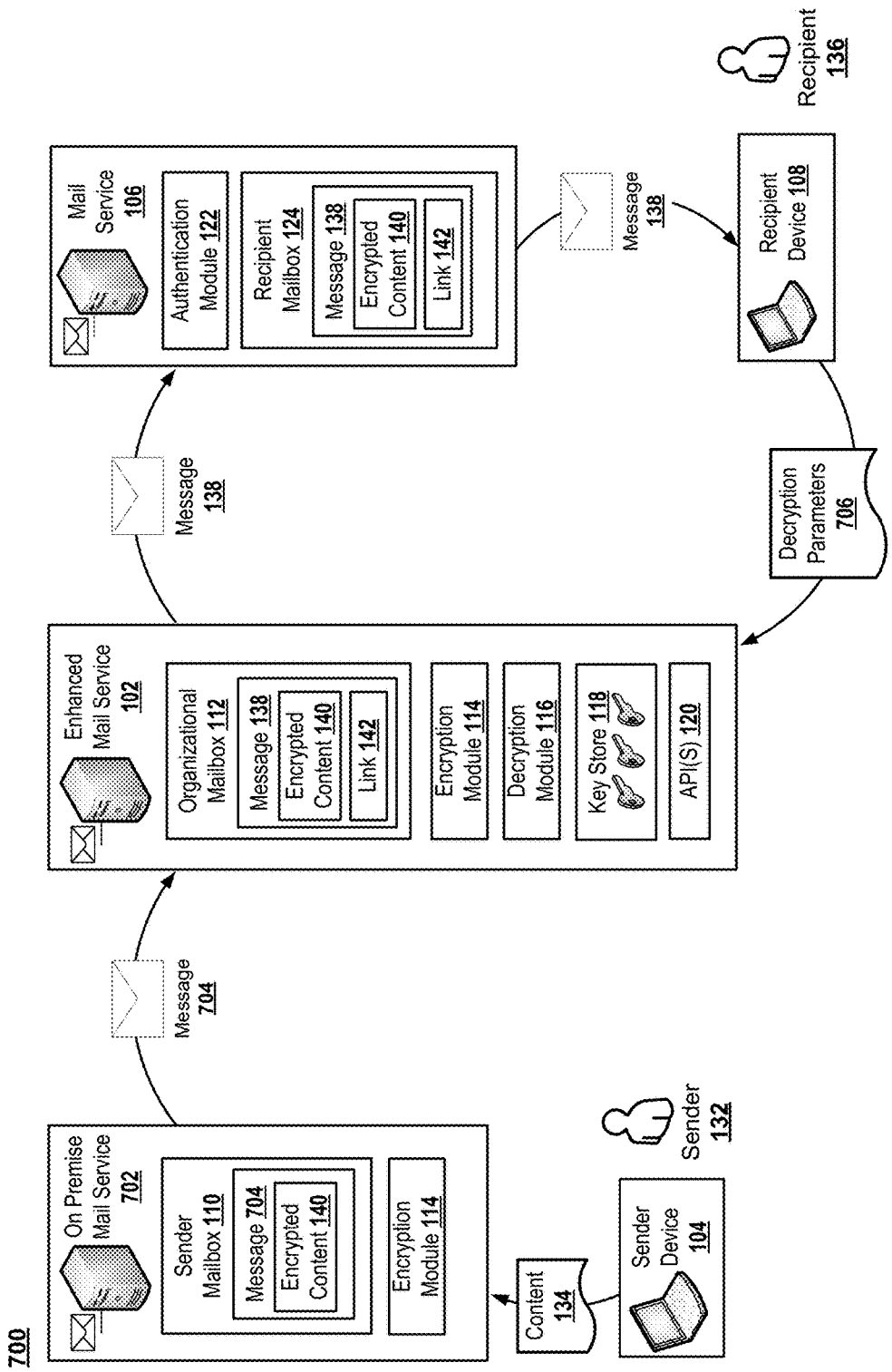

FIG. 7A illustrates an example data flow scenario of a system that includes an on-premise mail service in communication with the enhanced email service to provide an intended recipient with decrypted access to encrypted content that is stored in an organizational mailbox at the enhanced email service.

Figure 7B:
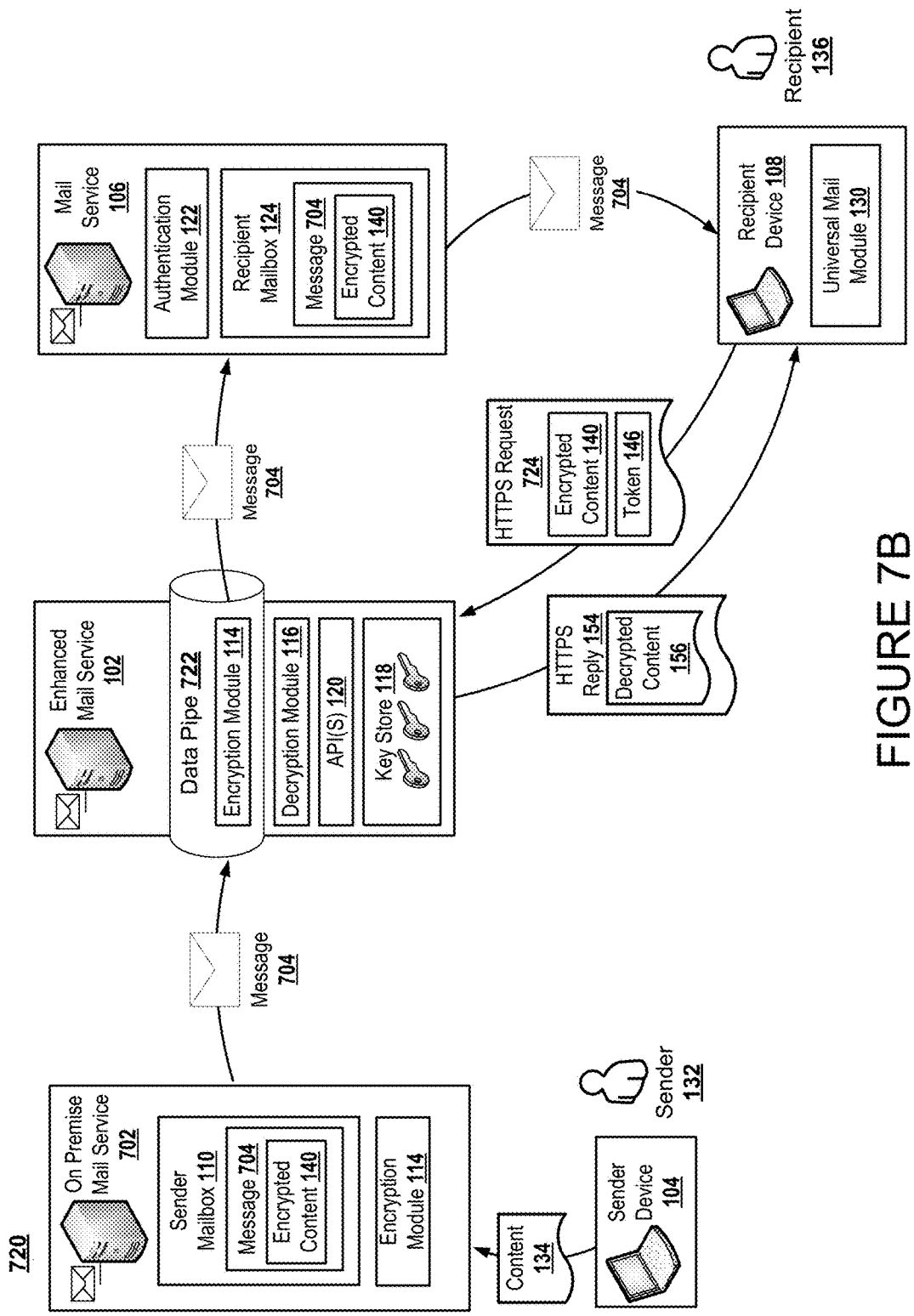

FIG. 7B illustrates an example data flow scenario of a system that includes an on-premise mail service in communication with the enhanced email service to provide the intended recipient with decrypted access to encrypted content via the universal mail module without storing the encrypted content on the enhanced mail service.

Figure 7C:
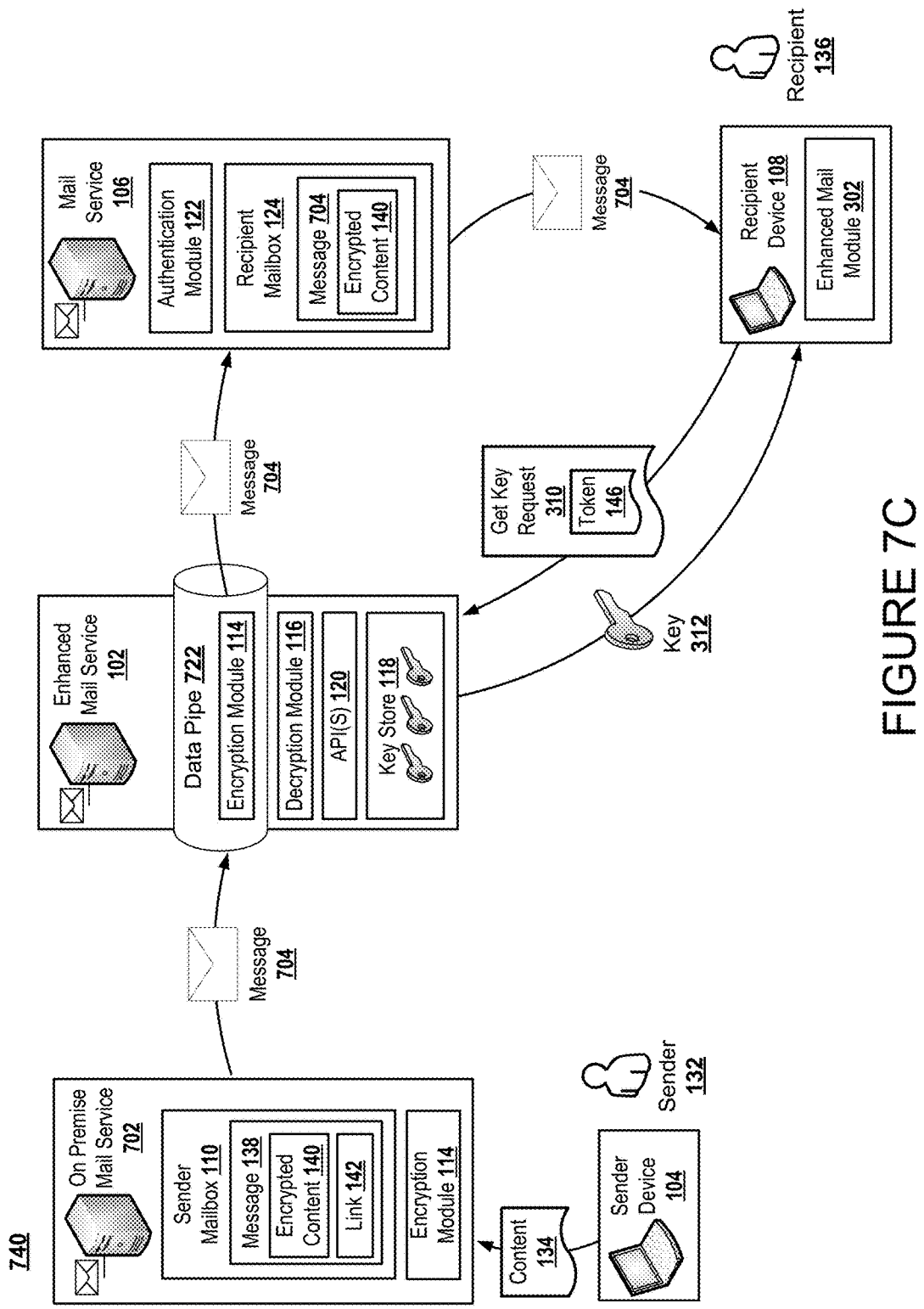

FIG. 7C illustrates an example data flow scenario that is similar to that of FIG. 7B except where the enhanced email service provides decrypted access to encrypted content via the enhanced mail module without storing the encrypted content on the enhanced mail service.

Figure 8:
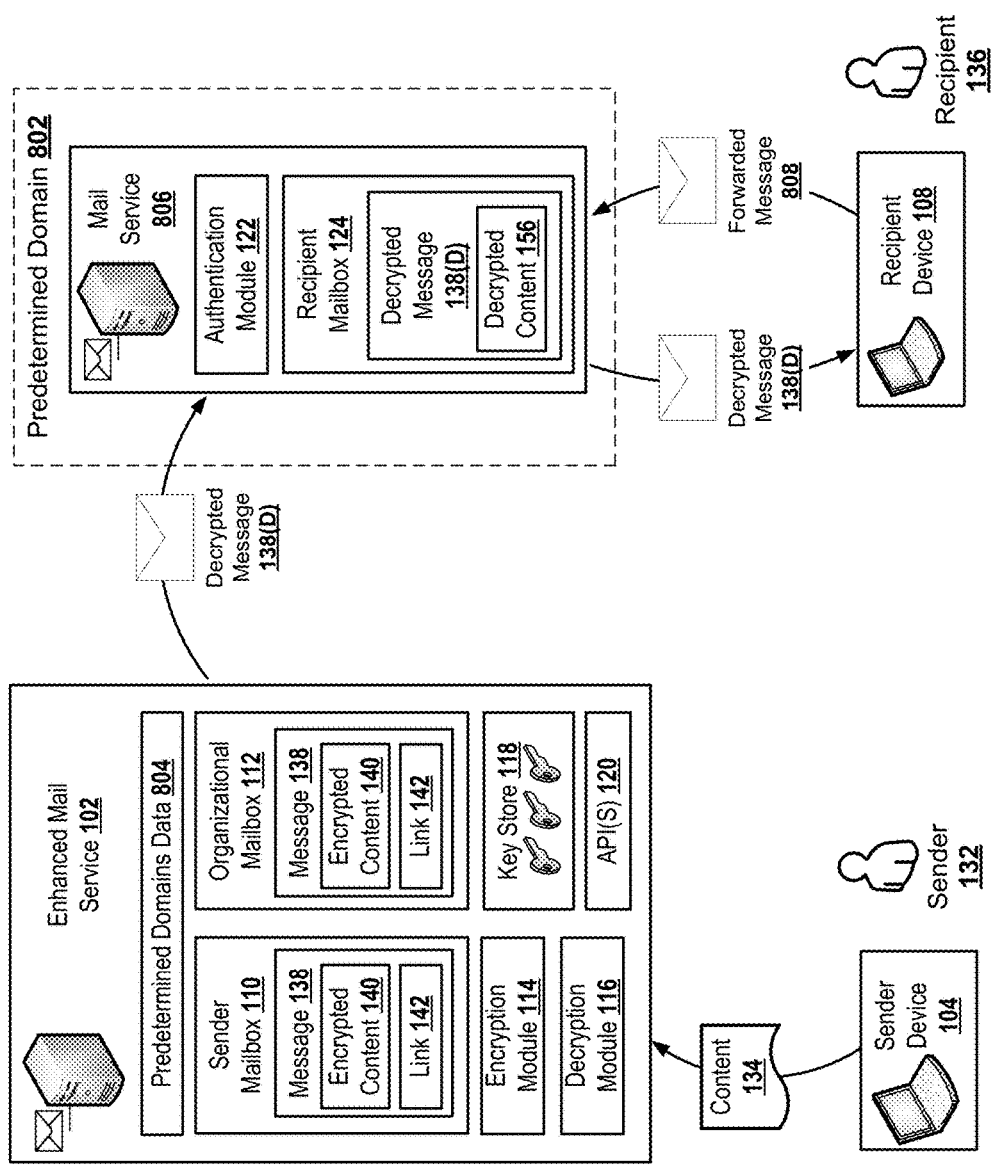

FIG. 8 illustrates an example data flow scenario in which the enhanced mail service provides a decrypted version of a message to the recipient mailbox based on the recipient mailbox being associated with a predetermined domain.

Figure 9:
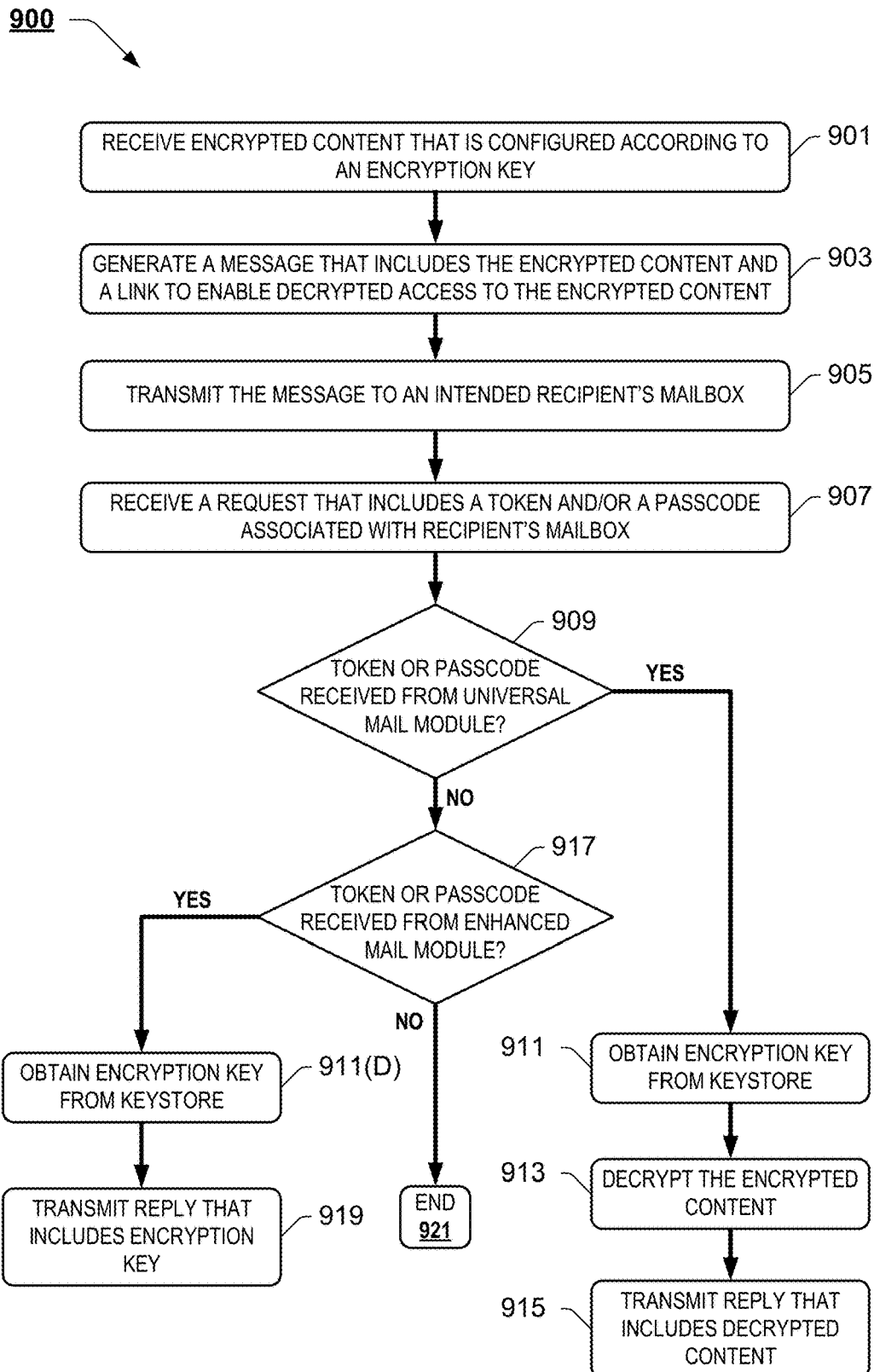

FIG. 9 is a flow diagram of an illustrative process of selecting between various decryption methods based upon whether decrypted access is requested by a universal mail module or an enhanced mail module.

Figure 10:
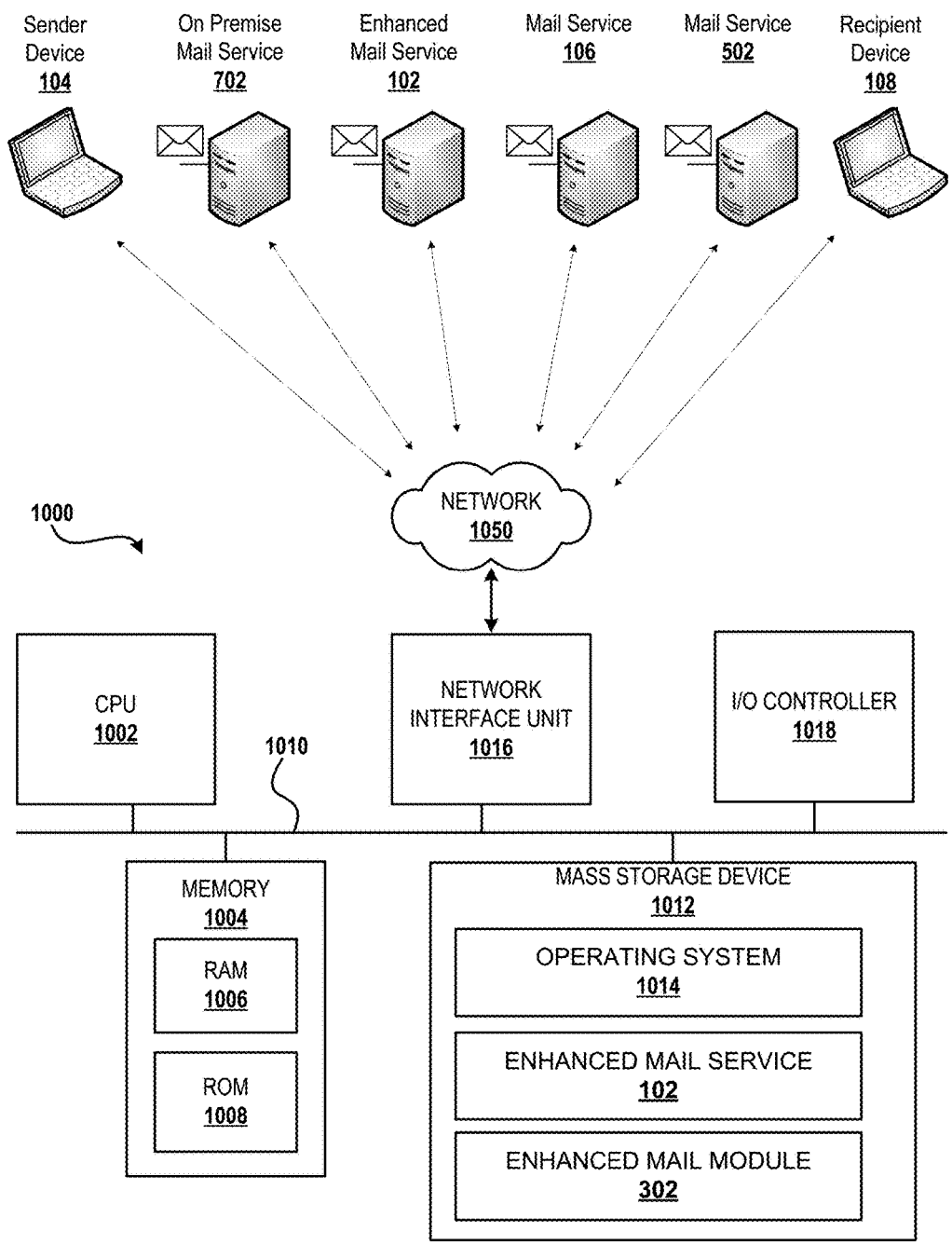

FIG. 10 shows additional details of an example computer architecture for a computer capable of executing the enhanced mail service, and/or enhanced mail module, and/or any program components thereof as described herein.

DETAILED DESCRIPTION

The following Detailed Description describes technologies for providing an enhanced email service that mitigates drawbacks associated with conventional email services by, for example, enabling transmission of encrypted content to an intended recipient regardless of the intended recipient having a prior relationship with the sender or having obtained credentials from a certificate authority (CA). Generally described, configurations disclosed herein reduce barriers to successfully and confidently transmitting encrypted message content to any recipient email address.

According to aspects of the present disclosure, a method is provided for receiving encrypted content and, based thereon, generating a message that designates a recipient email address and includes both the encrypted content as an attachment and a link to enable decrypted access to the decrypted content. The method may also include transmitting the message to the intended recipient's mailbox while also storing the message in an organizational mailbox (and in some instances a sender mailbox as well) to provide for subsequent decryption of the encrypted content. The link may be configured to provide the intended recipient of the message with decrypted access to the encrypted content in various ways depending on, for example, whether the recipient is viewing the message through a universal mail module such as, for example a webmail browser providing access to a web mail service, or through an enhanced mail module that includes enhanced compatibilities with respect to the enhanced email service (as will be discussed in relation to FIG. 5).

Figure 1:
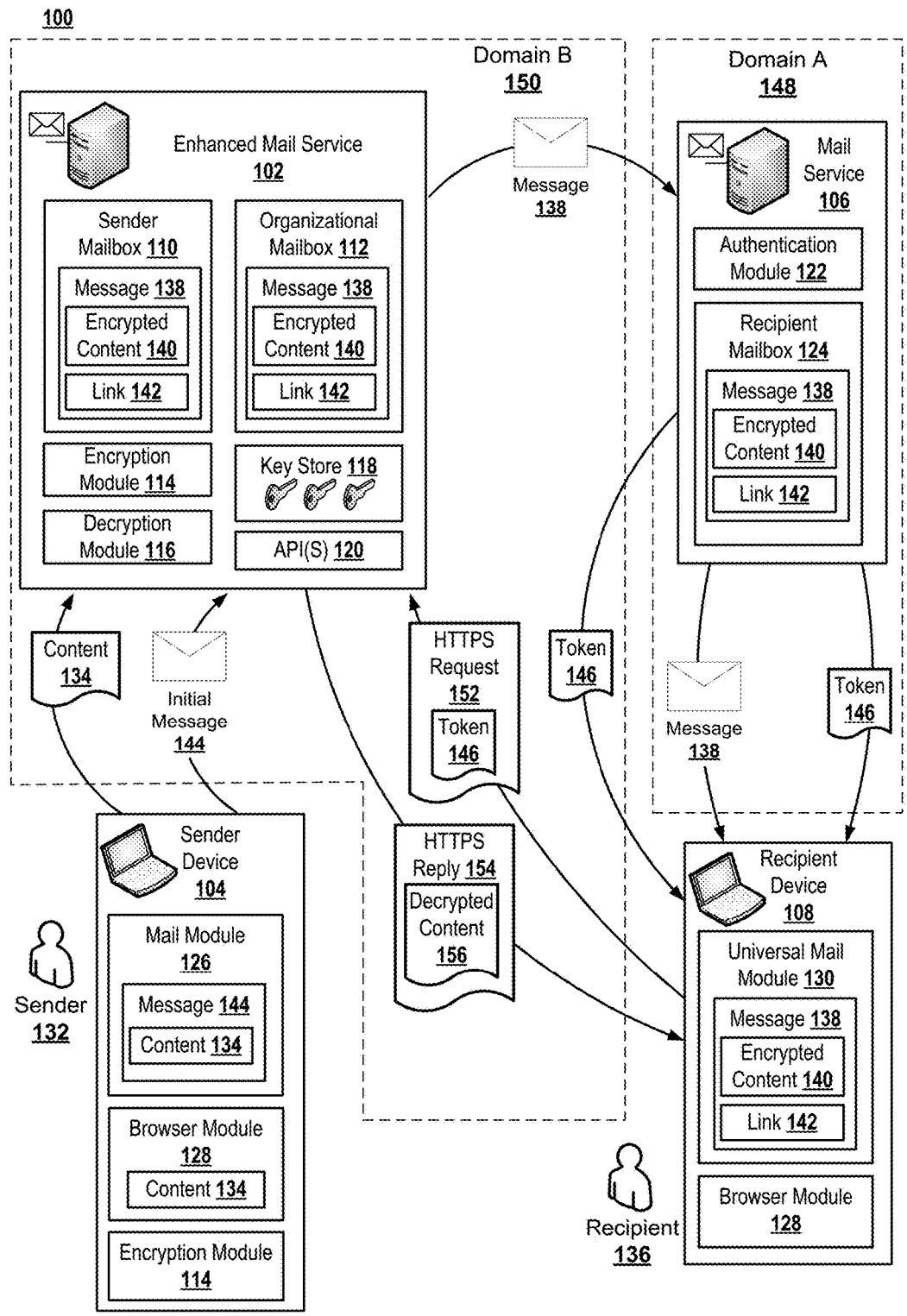

For illustrative purposes, consider with respect to FIG. 1 a first scenario where the recipient of a message containing encrypted content is viewing the message through a universal mail module such as, for example, a webmail service. In such a case, a web browser running on the recipient's device may have a webmail service open in a first domain from which the link is displayed within an email message. The link may provide access to a webpage in a second domain that exposes an authentication module application programming interface (API) of the intended recipient's webmail service. The first domain may be associated with the recipient's webmail service (e.g. Gmail™ webmail service, Yahoo® webmail service) while the second domain may be associated with the enhanced email service (e.g., Office 365). Upon a recipient providing credentials to and receiving a token from the authentication module API, the token may be provided to the enhanced email service in the second domain to cause the enhanced email service to locally decrypt the encrypted content on the server side and display it to the recipient in the form of a web page. It is with consideration to this first scenario that the following discussion of FIGS. 1 and 2A-2C is based. It can be appreciated any reference to "first," "second," etc. items within the description is not intended to and should not be construed to necessarily correspond to any reference of "first," "second," etc. elements of the claims. For example, within the specification an item such as domain A of FIG. 1 may be referred to as a "first domain" while being referred to as a "second domain" within the claims depending on the context.

Turning now to FIG. 1, details will be provided regarding an illustrative operating environment and several software components disclosed herein. FIG. 1 is a system diagram showing aspects of an illustrative system for providing decrypted access to message content via a universal mail module such as an online webmail service (Gmail™ webmail service) being accessed via a web browser (Chrome™ browser). The system 100 shown in FIG. 1 includes an enhanced mail service 102 capable of receiving, generating, sending, routing, and/or storing email messages. The enhanced mail service 102 may be one or more computing devices such as the example computing device architecture shown in FIG. 10 and described in more detail below.

FIG. 1 shows the enhanced mail service 102 receiving content 134 from a sender device 104 and, ultimately, transmitting that content 134 to a mail service 106 which is addressable by a recipient device 108 to access the content 134. In this regard, it should be appreciated that each of the enhanced mail service 102 and/or the mail service 106 may refer to any number of computing devices, working alone or in concert, capable of sending and/or receiving email.

The enhanced mail service 102 may comprise functional components including, but not limited to, a sender mailbox 110 associated with a sender of the content and an organizational mailbox 112 that is configured with novel functionalities as described herein for providing an intended recipient of encrypted content with the ability to obtain decrypted access to that content. It can be appreciated that the sender mailbox 110 may correspond specifically to the sender and may be accessible based on credentials that uniquely correspond to the sender. For example, the sender mailbox may include data associated with a sender email account including but not limited to inbox data associated with messages received by the sender email account and outbox data associated with messages sent from the sender email account. Furthermore, the sender mailbox may be accessible by the sender upon providing credentials associated with the sender mailbox and/or an authenticating token associated with the sender mailbox.

As will be described in more detail below, in various embodiments the organizational mailbox 112 may be used to store a message containing encrypted content and/or a link to provide decrypted access to the encrypted content 140. Furthermore, in some embodiments, the organizational mailbox 112 may be accessible through use of a token provided by the mail service 106 to the recipient device 108 and then ultimately provided by the recipient device 108 to the enhanced mail service 102. In various embodiments, the organizational mailbox 112 may be inaccessible via use of sender credentials associated with the sender email account and/or the sender mailbox 110. For example, although a sender may take actions that cause a message to be stored in the organizational mailbox 112, the stored message may reside in the organizational mailbox 112 for the purpose of providing subsequent access to decrypted versions of the encrypted content to the recipient—not for the purpose of subsequent access by the sender. In some embodiments, the organizational mailbox 112 may store multiple messages from multiple different senders. For example, the organizational mailbox may contain a first message that corresponds to a first sender and is intended to provide decrypted access of encrypted content to a first recipient while at the same time containing a second message that corresponds to a second sender and is intended to provide decrypted access of different encrypted content to a second recipient. In some embodiments, the organizational mailbox 112 may correspond to a specific organization such as, for example, an engineering firm, and the organizational mailbox 112 may contain multiple messages sent from various members and/or employees of the specific organization.

The enhanced mail service 102 may further include an encryption module 114 for encrypting content 134 into encrypted content 140 according to an encryption key, a decryption module 116 for decrypting content according to the encryption key, and a key store 118 for managing access rights with respect to the encryption key. The encryption module 114 may include any encryption functionality and/or software suitable for encrypting digital content according to an encryption key whether currently known or subsequently developed. Similarly, the decryption module 116 may include any decryption functionality and/or software suitable for decrypting encrypted digital content according to an encryption key whether now known or subsequently developed.

The key store 118 may include any functionality and/or software suitable for managing access rights with respect to encryption keys. In some embodiments, one or more functionalities of the encryption module 114, the decryption module 116, and/or the key store 118 may be performed by a rights management service platform such as, for example, Microsoft's Azure RMS. Finally, in some configurations, the enhanced mail service 102 comprises at least one application programming interface ("API") 120 that exposes an interface through which devices and services described herein communicate data. Through use of this data interface and other interfaces, the devices and services described herein can communicate and process data in such a manner as to enable the functionality disclosed herein. For example, as described in detail below, the API 120 may enable the enhanced email service 102 to receive an HTTPS request 152 containing a token 146 from the recipient device 108 and provide decrypted content 156 via a Web page.

The mail service 106 may comprise functional components including, but not limited to, an authentication module 122 and a recipient mailbox 124. It can be appreciated that the recipient mailbox 124 may correspond specifically to the recipient and may be accessible based on credentials that uniquely correspond to the recipient. For example, the recipient mailbox 124 may include data associated with a recipient email account of the recipient including but not limited to inbox data associated with messages received by the recipient email account and outbox data associated with messages sent from the recipient email account. Furthermore, the recipient mailbox 124 may be accessible by the recipient upon providing credentials associated with the recipient to the authentication module 122. For example, in some embodiments the recipient credentials may include each of a username and a password which the user may provide to the authentication module 122 in exchange for an authentication token. In some embodiments, the authentication module 122 may be configured to authenticate the recipient based on single factor authentication (SFA). For example, the recipient may be given access to a recipient mailbox corresponding to a specific email address upon providing a single factor of authenticating evidence, e.g. a single password. In some embodiments, the authentication module may be configured to authenticate the recipient based on multifactor authentication (MFA). For example, the recipient may be given access to a recipient mailbox corresponding to the specific email address only upon providing multiple factors of authenticating evidence, e.g. a password in addition to some other piece(s) of authenticating evidence. In some embodiments, the authentication module 122 may further be configured to provide cross domain authentication. For example, as will be described in more detail below, the authentication module 122 may enable the recipient to authenticate herself with respect to a domain associated with the enhanced mail service 102 using an authentication module that is operating within a domain associated with the mail service 106. For example, the authentication module 122 may be configured to deploy one or more open standards for user authentication such as, for example, OAuth 1.0 and/or OAuth 2.0. It can be appreciated that OAuth is a commonly used mechanism to permit users to share information about accounts with third-party websites and/or to sign into third-party websites using authentication data associated with accounts other than those hosted by the third-party websites. Stated alternatively, OAuth may provide for cross-domain user authentication.

The sender device 104 may comprise functional components including, but not limited to, a mail module 126, a browser module 128, and/or an encryption module 114 that is similar to the encryption module described with relation to the enhanced mail service 102. The mail module 126 may include any suitable module for generating, receiving, sending, and/or viewing emails. In some embodiments, the mail module 126 may include a web-based email service being accessed via a standard web-based browser. For example, the mail module 126 may be comprised of a Google™ Chrome™ web browser providing access to a Yahoo® webmail account. Accordingly, it can be appreciated that the mail module 126 need not be a dedicated mail client locally installed at the sender device 104. In some embodiments, the mail module 126 may include a web-based email service being accessed via a mail client that is operated locally on the sender device 104. For example, the mail module 126 may be comprised of a locally installed version of Microsoft® Outlook® providing access to a Gmail™ webmail account. The browser module 128 may include any program suitable for retrieving and presenting information resources obtained from the World Wide Web and/or uploading information to resources accessible via the World Wide Web. In various embodiments, the web browser 128 may further be used to access information provided by Web servers and private networks or files and file systems.

The recipient device 108 may comprise functional components including, but not limited to, a universal mail module 130 and/or a browser module 128 that is similar to the browser module 128 described with relation to the sender device 104. In some embodiments, the universal mail module 130 may include any functional component suitable communicating with the authentication module 122 of the mail service 106 to authenticate the recipient device with respect to the mail service 106, and ultimately, to provide access to the recipient mailbox 124, e.g. to enable it recipient to use a corresponding email address. In some embodiments, the universal mail module 130 may include a web-based email service being accessed via a standard web-based browser. For example, the universal mail module may be comprised of a Google™ Chrome™ web browser providing access to a Yahoo® webmail account. As used herein, a universal mail module is any email module configured to access one or more email accounts but which lacks certain enhanced communication compatibilities with respect to the enhanced mail service as described below with respect to the enhanced mail module. Stated alternatively, a universal mail module is any email module that is not an enhanced mail module as described herein.

With respect to the example data flow scenario of FIG. 1, a sender 132 is shown to transmit content 134 from the sender device 104 to the enhanced mail service 102 to provide a recipient 136 with access to the content 134 at the recipient device 108. For security purposes, however, it is desirable to transmit the content 134 to the recipient device 108 in an encrypted format. Accordingly, the content 134 may be transmitted to the mail service 106 within a message 138 that includes encrypted content 140 and a link 142 to provide decrypted access to the encrypted content 140.

It can be appreciated that the content 134 can be transmitted to the enhanced email service 120 in a variety of formats. For example, the content 134 can be transmitted to the enhanced mail service 102 in an unencrypted format or in an encrypted format. In some embodiments, the enhanced mail service 102 receives the content 134 in an unencrypted format and, upon receipt, deploys the encryption module 114 to convert the content 134 into the encrypted content 140 according to an encryption key. The enhanced mail module 102 may then store the encryption key within the key store 118 in association with a recipient email address of the intended recipient 136. For example, the sender 132 may use the mail module 126 on the sender device 104 to generate an initial message 144 that includes the content 134 in an unencrypted format and then transmit that initial message 144 to the enhanced mail service 102. Alternatively, the sender may access a web portal or webpage associated with the enhanced mail service 102, e.g. via the browser module 128, and may upload the content 134 to the enhanced mail service via the web portal page. In some embodiments, the enhanced mail service 102 may receive the content 134 in an encrypted format from the sender device 104. For example, the sender 132 may deploy the encryption module 114 on the sender device 104 to encrypt the content 134 to generate the encrypted content 140 prior to transmitting the content to the enhanced mail service 102.

Upon receiving the encrypted content 140, the enhanced mail service 102 may generate the message 138 that includes the encrypted content 140 and the link 142 to enable decrypted access to encrypted content 140. In some embodiments, the encrypted content 140 is included within the message 138 as an attachment whereas the link 142 can be included within a body of the message 138. The message 138 may then be sent to the recipient mailbox 124 at the mail service 106. For example, the message 138 may designate a recipient email address that corresponds to the recipient mailbox 124 and then the enhanced mail service 102 may transmit the message 138 to the recipient mailbox 124 via one or more known email transmission protocols. It can be appreciated then that the message 138 may then be accessed by the recipient 136 using the recipient device 108 upon authenticating the recipient device 108 with respect to the mail service 106 using the authentication module 122. For example, the recipient 136 may provide user credentials to the authentication module 122 via the universal mail module 130 which may then trigger the mail service 106 to provide a token 146 to the universal mail module 138.

Upon authentication of the recipient device 108, the mail service 106 may then transmit the message 138 to the universal mail module 130 at the recipient device 108. For example, the message 138 may be sent to an inbox at the universal mail module 130 and may be viewable by the recipient 136 to the extent that the message 138 and/or contents thereof are unencrypted. For example, it can be appreciated that although the encrypted content 140 may now reside on the recipient device 108 it may still be inaccessible by the recipient 136 due to its encryption.

In addition to transmitting the message 138 to the mail service 106, the enhanced mail service 102 may also store the message 138 in the organizational mailbox 112 to provide subsequent decrypted access of the encrypted content 140 to the intended recipient 136 via activation of the link 142. For example, the link 142 may be displayed within a body of the message 138 to enable the recipient 136 to provide the token 146 to the enhanced mail service 102 by exposing the authentication module 122 of the mail service 106 to the enhanced mail service 102. In some embodiments, the mail service 106 may correspond to a domain A 148 whereas the enhanced mail service 102 may correspond to a domain B 150. The link 142 may enable the recipient 136 to re-retrieve the token 146 again from the mail service 106 but from within the domain B 150 that corresponds enhanced mail service 102. For example, the link 142 may be configured to expose one or more APIs of the authentication module 122 within the domain B 150 to thereby enable the recipient device 108 to cache the token 146 with respect to the enhanced mail service 102. It can be appreciated that retrieving the token 146 from within a browser tab associated domain B 150 may in some instances be desirable as various versions of web browsers may cache tokens discreetly with respect to single web domains. Stated alternatively, although the token 146 may have already been received at the recipient device with respect to domain A 148 it may be desirable to re-retrieve the token 146 within a webpage that is backed by the enhanced mail service 102 and with the recipient device is driven to on activation of the link 142 to cause the recipient device and/or a browser operating thereon to cache the token 146 with respect to the enhanced mail service 102.

In some embodiments, the universal mail module 130 may generate a request 152 that includes the token 146 in association with the recipient mailbox 124 and/or a corresponding recipient email address and transmit the request 152 to the enhanced mail service 102. In some implementations, the request 152 may be an HTTPS request that is transmitted via the browser module 128. Upon receipt of the request 152, the enhanced mail service 102 may determine whether the token 146 that is received from the recipient device 108 is authentic respect to the recipient mailbox 124 and/or corresponding email address. If it is determined that the token 146 is authentic with respect to the recipient mailbox 124, the enhanced mail service 102 may generate a reply 154 to the request 152 that includes decrypted content 156, i.e. a decrypted version of the encrypted content 140. The enhanced mail service 102 may access the message 138 within organizational mailbox 112 and more specifically may access the encrypted content 140 from within the message 138 to decrypt it using the decryption module 116. The enhanced mail service 102 may also access the encryption key, that corresponds to the encrypted content 140, from the key store 118. For example, upon generation of the encrypted content 140 that is intended for the recipient 136 the enhanced mail service may store an encryption key that is usable to decrypt the encrypted content 140 within the key store 118 in association with a recipient email address and/or the link 142. Accordingly, upon activation of the link 142 at the recipient device 108 to generate the request 152 that transmits the token 146 to the enhanced mail service 102, the enhanced mail service may decrypt the encrypted content 140 and serve the decrypted content 156 to the recipient device 108. For example, the enhanced mail service 102 may provide access to a webpage that displays the decrypted content 156.

It can be appreciated that in the example dataflow scenario of FIG. 1, the encrypted content 140 is decrypted on the server side, i.e. at the enhanced mail service 102, rather than locally at the recipient device 108. Accordingly, in various implementations the encrypted content 140 may be transmitted to and/or stored on devices which do not ultimately decrypt the encrypted content 140. Stated alternatively in the example dataflow scenario of FIG. 1, the copies of the encrypted content 140 that reside on the mail service 106 and the recipient device 108 are ultimately not used to provide the decrypted access the encrypted content 140. However, as will be described in more detail with respect to FIG. 3, the encrypted content 140 may still be communicated within the message 138 to the recipient device 108 to allow users having an enhanced mail client, such as Outlook, to readily decrypt and view the encrypted content.

Figure 2A:
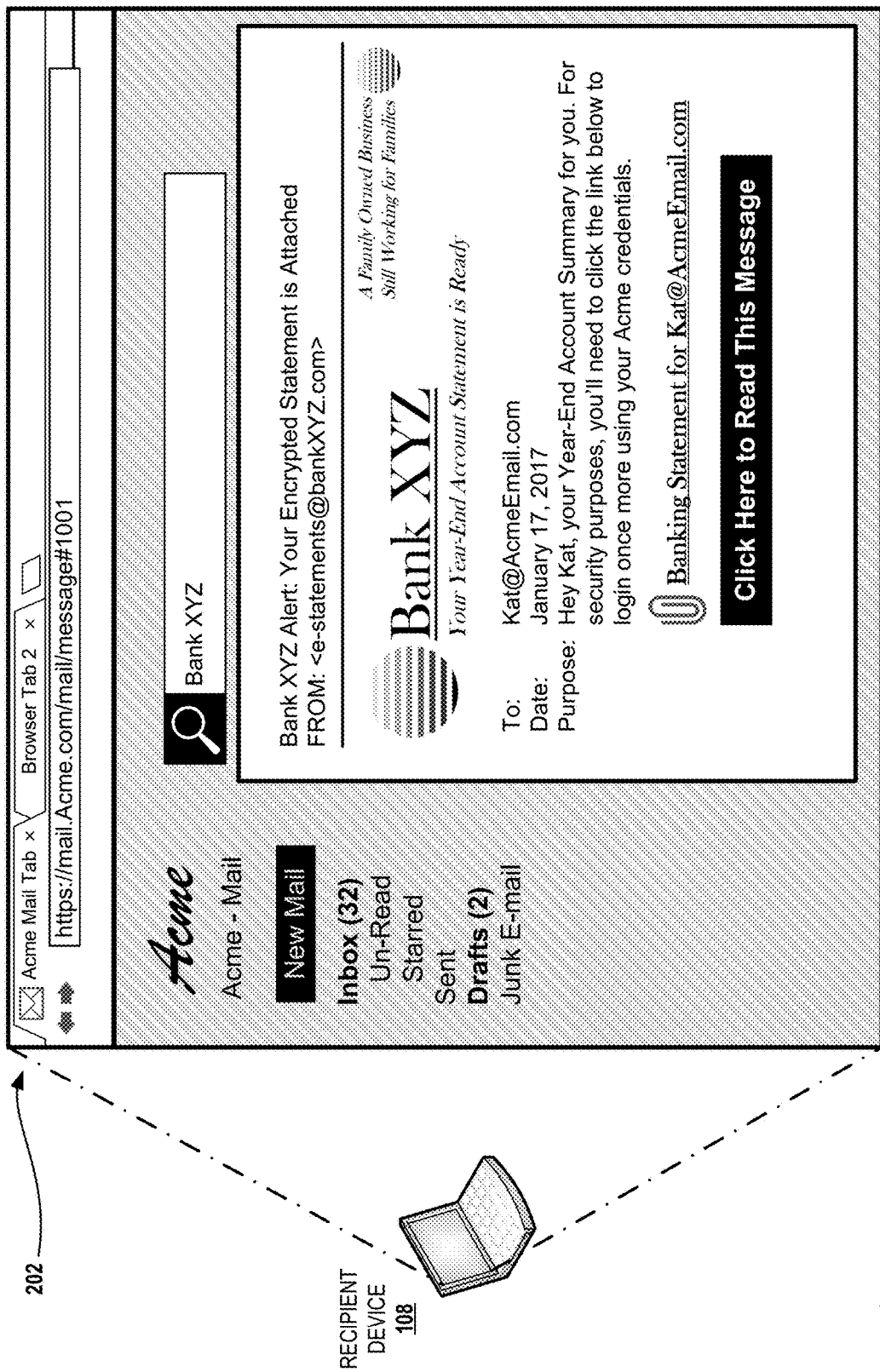
FIG. 2B illustrates aspects of a UI that can be displayed on the user device in association with the data flow scenario of FIG. 1 responsive to the user activating the link displayed in FIG. 2A to expose an authentication module associated with the recipient's email service provider to the enhanced mail service.
FIG. 2C illustrates aspects of a UI that can be displayed on the user device in association with the data flow scenario of FIG. 1 responsive to the user successfully authenticating herself with respect to the enhanced mail service. As illustrated, the UI may display decrypted content to the user via any suitable web-based protocol.

Turning now to FIG. 2A, aspects of a user interface (UI) 202 are illustrated that can be displayed on the recipient device 108 in association with the data flow scenario of FIG. 1. These aspects may communicate instructions to the recipient 136 on how to obtain the decrypted access of the encrypted content 140. UI 202 is displayed in the form of an email message being viewed through a web browser providing access to a web-based email service. The illustrated web browser has two open tabs with a first tab being open to display the email message and the second tab that could be displaying any other webpage. In this hypothetical scenario, the email message is an electronic bank statement generated by Bank XYZ and that has been sent to Kat@AcmeEmail.com to provide this recipient with access to the encrypted content 140, e.g. the encrypted bank account statement. The email message explains to Kat the purpose of the communication, e.g. that her year-end account statement is ready, and that for security purposes she will need to click the illustrated link to login once again using her Acme email account credentials. It can be appreciated that the link illustrated which recites "Click Here to read This Message" corresponds to the link 142 discussed with relation to FIG. 1. It can also be appreciated that the attachment of the email (e.g. as represented by the paperclip symbol adjacent to the words "Bank Statement for Kat@AcmeEmail.com" corresponds to the encrypted content 140 as discussed with relation to FIG. 1.

Figure 2B:
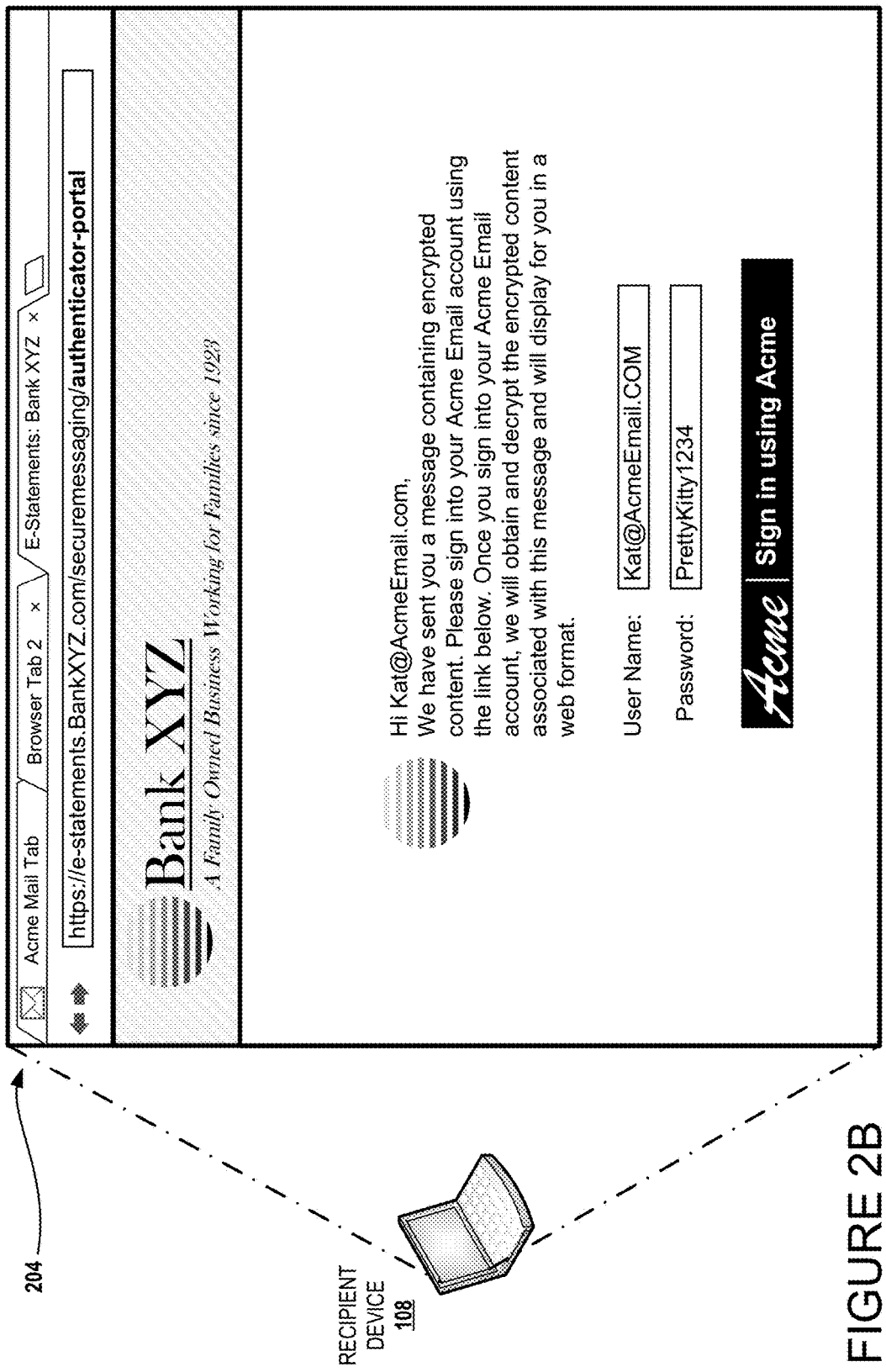
Figure 2C:
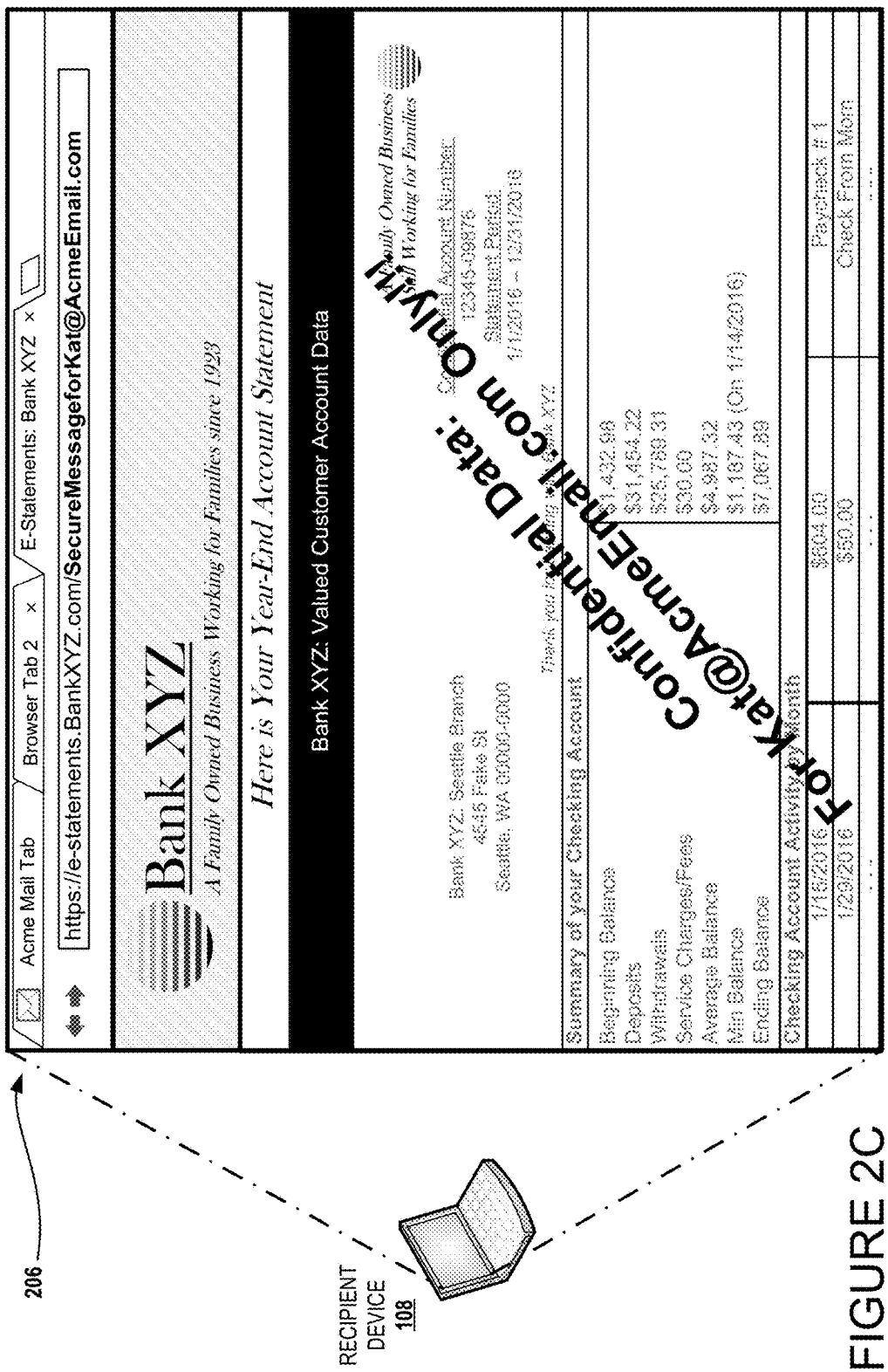

Turning now to FIG. 2B, upon clicking the link 142 the recipient 136 may be taken to a webpage displaying a UI 204 that is backed and/or hosted by the enhanced mail service 102 to expose the authentication module 122 of the mail service 106 to the enhanced mail service 102. For example, in some implementations clicking the link 142 displayed within the email message of FIG. 2A (i.e. UI 202) may deploy OAuth protocols of the mail service 106 to enable authentication of the recipient 136 with respect to the enhanced mail service 102. As illustrated in FIG. 2B, the webpage enables the recipient 136 to enter credentials associated with the recipient email address that corresponds to recipient mailbox 124. It can be appreciated that while user credentials may include a username and password combination, any other type of credentials may also be used. For example, in some embodiments recipient 136 may be required to enter a time sensitive code that is sent to a mobile device or read off a security key fob. In the illustrated scenario, the recipient 136 may enter a username and password combination associated with the Acme email account to authenticate the recipient device 108 with respect to the enhanced mail service 102. Then, once the recipient 136 has successfully signed in, the enhanced mail service will obtain the encrypted content 140 from the organizational mailbox 112 in addition to the corresponding encryption key from the key store 118 to decrypt the encrypted content 140. Turning now to FIG. 2C, the decrypted content 156 may then be provided to the recipient device 108 via the HTTPS reply 154 to generate UI 206. For example, confidential account data associated with the recipient 136 in which the enhanced mail service 102 transmitted to the recipient device 108 in an encrypted format is displayed to the recipient 136 via the web browser module 128. It can be appreciated that in an implementation in which the universal mail module 130 is a web browser providing access to a web based mail service, the universal mail module 130 may simply correspond to the "Acme Mail Tab" and the reply 154 may correspond to another tab that is caused to open upon authentication of the recipient device 108.

With respect to each of FIGS. 2B and 2C, for example, it can be appreciated that in various implementations webpages that are backed by the enhanced mail service 102 may be customized with visual characteristics corresponding to the sender of the message 138. For example, as illustrated the sender of the message 138 is the banking entity Bank XYZ which may desire to include logos and/or business slogans as additional visual cues to the recipient 136 as to the source of the message 138. Further, despite being backed and/or hosted by the enhanced mail service 102 that is managed by another business entity, the webpage may be configured to display a web address associated with a domain name corresponding to the sender 132 and not by a domain associated with the business entity hosting the enhanced mail service 102. For example, as illustrated the webpage address is indicated to be "https://e-statements.BankXYZ.com/securemessaging/authenticator-portal" within the address bar. In addition, the logos and text in the webpage may further be configured to cause the tab name and other text to be displayed as "E-Statements: Bank XYZ" and not displayed the business entity hosting the enhanced mail service 102. Accordingly, it can be appreciated that the enhanced mail service 102 may enable the sender 132 to customize various aspects of a webpage to be displayed upon the recipient 136 activating the link 142.

As a recap to the dataflow scenario of FIG. 1, the enhanced mail service 102 may receive encrypted content 140 that is encrypted according to an encryption key and may then generate a message that includes the encrypted content 140 as an attachment and also a link 142. The message 138 may then be stored in each of a sender mailbox 110 and an organizational mailbox 112. Although the sender mailbox 110 may be accessible based on sender credentials, in some embodiments, the organizational mailbox 112 cannot be accessed by the sender 132 whatsoever. Rather, in some configurations, the organizational mailbox 112 is configured to provide decrypted access of the encrypted content to the recipient 136 by the use of a token or by use of a passcode. For example, the organizational mailbox 112 may be accessible based upon recipient of a token associated with credentials, e.g., an email of the recipient. The message 138 may also be sent to the recipient mailbox 124 and ultimately to the recipient device 108. The recipient 136 may then use to click the link 142 for the purpose of transmitting an HTTPS request 152 to the enhanced mail service 102. A token 146 that is provided with the HTTPS request 152 may serve as proof to the enhanced mail service 102 that the originator of the request 152 is the intended recipient 136 of the message 138. Then, the enhanced mail service may decrypt the encrypted content 140 and send it to the recipient device 108 in a format that is viewable via a web browser. Furthermore, in this particular dataflow scenario, the encrypted content 140 that that resides on the user device 108 within the message 138 is not ultimately used to provide the decrypted access to the content 134—rather the copy of the content 140 that is stored at the organizational mailbox 112 provides decrypted access.

In some implementations, however, the copy of the encrypted content 140 that is transmitted to the recipient device 108 is used to provide the decrypted access to the encrypted content 140. For illustrative purposes, consider, with respect to FIG. 3, a second scenario where the recipient of the message 138 containing the encrypted content 140 is viewing the message 138 through an enhanced mail module 302 that is configured with enhanced communication capabilities with respect to the enhanced mail service 102. For example, the enhanced mail module 302 may be the Outlook client program and the enhanced mail service 102 may be Office 365. In some configurations, the enhanced mail module 302 may be configured to store recipient credentials, e.g. a username and password combination, and automatically authenticate the recipient device 108 respect to the mail service 106 as needed. In such a case, the enhanced mail module 302 may be configured to automatically authenticate the recipient device 108 with the enhanced mail service 102 by sending a request to the enhanced mail service 102 that includes the token 146. The request may be for an encryption key corresponding to encrypted content attached to a particular message. In some embodiments, the request that includes the token 146 may be a get key request that causes the enhanced mail service 102 to reply by sending the encryption key 312 that corresponds to the encrypted content to the enhanced mail module. At the recipient device 108, the encryption key 312 is then deployed to the decryption module 306 to decrypt the encrypted content 140 to generate decrypted content 156 and automatically display the decrypted content 156 on a display device to the recipient 136.

Furthermore, in some embodiments, the decrypted content is stored on a volatile cache to prevent sensitive materials, e.g. the decrypted content, from being permanently stored on the device. It can be appreciated that in such an embodiment the copy of the encrypted content 140 that resides on the recipient device 108 is used to provide the decrypted access to the content to the recipient. It is with consideration to this first scenario that the following discussion of FIGS. 3-4 is based.

Turning now to FIG. 3, an example data flow scenario is illustrated of a system 300 in which the enhanced email service 102 provides the intended recipient 136 with decrypted access to encrypted content 140 through an enhanced mail module 302. In various embodiments, the enhanced mail module 302 may be configured to store recipient credentials 304, which are usable by the enhanced mail module 302 to transmit token requests to the mail service 106. For example, the enhanced mail module 302 may be a locally operated mail client configured to accept user credentials such as an email address and password combination from the recipient 136. The enhanced mail module 302 can automatically perform any necessary authentication protocols with the mail service 106 and the enhanced mail module 302. The enhanced mail module 302 may also include a decryption module 306 configured to decrypt encrypted content according to an encryption key. The enhanced mail module 302 may also include a volatile cache 308 for storing a version of the message 138 that includes the decrypted content 156.

It can be appreciated that numerous aspects of this example dataflow scenario are similar to that illustrated with respect FIG. 1. However, there are differences with respect to the communication between the enhanced mail module 302 and the enhanced mail service 102. In particular, as illustrated, the enhanced mail module 302 may transmit a get key request 310 that contains the token 146 to obtain the encryption key 312 that corresponds to the encrypted content 140. Upon receipt of the encryption key 312, the enhanced mail module 302 may generate a rendering of the message 138 that automatically displays the decrypted content 156 to the recipient without manual user interaction. Accordingly, it can be appreciated that by deploying the enhanced mail module 302 as opposed to the universal mail module 130 the recipient 136 may obtain better (e.g. more seamless) user experience with respect to obtaining the decrypted access to the content.

As illustrated, the sender 132 may transmit content 134 to the enhanced mail service 102 which may then generate encrypted content 140 by deploying the encryption module 114 to generate the message 138 that includes the encrypted content and the link 142. The enhanced mail service 102 may store copies of the message 138 in each of a sender mailbox 110 and the organizational mailbox 112. The message 138 is sent to the recipient mailbox 124 that is accessed by the enhanced mail module 302 to receive a local copy of the message 138. In some embodiments, the enhanced mail module 302 may be configured to recognize one or more characteristics of the message 138 and respond to such characteristics by automatically obtaining the key 312. For example, the enhanced mail module 302 may recognize and/or activate the link 142 to generate the get key request 310 to transmit the token 146 to the enhanced mail service 102. Upon receipt of the get key request 310, which may uniquely identify the message 138 to enable the enhanced mail service 102 to authenticate the token 146 with respect to the message 138, the enhanced mail service 102 may access the key store 118 to retrieve the encryption key 312 corresponding to the encrypted content 140. The enhanced mail service 102 may then transmit the encryption key 312 to the enhanced mail module 302 and/or the decryption module 306 thereof. Upon receipt of the encryption key 312, the decryption module 312 may decrypt the copy of the encrypted content 140 that has been sent to the recipient device 108 to locally generate the version of the message 138 containing the decrypted content 156. In some embodiments, the decrypted content 156 may be stored temporarily in the volatile cache 308 so that the decrypted content 156 does not permanently remain on the recipient device 108.

In some embodiments, the enhanced mail module 302 may automatically generate a token request 314 based on stored recipient credentials 304 in response to one or more actions, such as the execution of the enhanced mail module 302 on the recipient device 108. For example, the enhanced mail module 302 may be configured to automatically communicate with the authentication module 122 at the mail service 122 when a user executes the enhanced mail module 302 on the recipient device 108. It can be appreciated that certain existing mail modules can include such functionality. Such as, for example, Microsoft® Outlook® desktop version as well other suitable native mobile device email clients. As the token 146 may be automatically retrieved and stored at the enhanced mail module 302, in various embodiments, it may not be necessary for the enhanced mail client 302 to re-retrieve the token 146 from the authentication module in order to generate the get key request 310.

In some embodiments, the enhanced mail module 302 may be configured to prevent messages that are stored within the volatile cache 308 from having various actions performed with respect thereto. For example, the enhanced mail module 302 may deny requests to forward and/or store and/or print the version of the message 138 containing the decrypted content 156. Furthermore, in some configurations, the system can be configured such that, even if it the recipient 136 were to forward the message 138 to a subsequent recipient, the subsequent recipient of that message would be denied access to view the decrypted content 156.

It can be appreciated that in the example dataflow scenario of FIG. 3, the encrypted content is decrypted on the device side, i.e. at the recipient device 108, rather than remotely at the enhanced mail service 102. Accordingly, the same message 138 which caused the enhanced mail service 102 to transmit decrypted content 156 to the recipient device 108 when viewed through the universal mail module 130 may cause the enhanced mail service 102 to transmit an encryption key 312 to the enhanced mail module 302 to perform local decryption.

Turning now to FIG. 4, aspects of a UI 400 are illustrated that can be displayed on the recipient device 108 in association with the data flow scenario of FIG. 3. These illustrations are based on the enhanced mail module 302 obtaining the encryption key 312 to generate the decrypted content 156, which may be displayed within the message. As illustrated, the UI 400 may display the decrypted content 156 in the message 138 through a universal reading pane view of the enhanced mail module 302. In some embodiments, the message 138 displaying the decrypted content 156 may be automatically generated and displayed by the enhanced mail module 302 upon the recipient 136 selecting the message 138 from within a list of messages associated with an inbox of the recipient mailbox 124. For example, the recipient 136 may use a cursor 402 double-click the message within an inbox view of the enhanced mail module 302. In some embodiments, the message 138 containing the decrypted content 156 may be automatically deleted from the volatile cache 308 upon the user selecting a different message from the inbox.

Turning now to FIGS. 5A-5B, in some scenarios, a mail service associated with the recipient mailbox 124 may lack certain authentication capabilities. For example, a mail service may lack the ability to generate tokens to enable the enhanced mail service 102 to authenticate the recipient device 108 with respect to the recipient mailbox 124. In such examples, various mail service providers may lack authentication module 122 which produces authenticating tokens that enable a recipient to authenticate herself with respect the enhanced mail service, e.g. prove to the enhanced mail service that she is the intended recipient. Accordingly, in some dataflow scenarios a passcode may be used in place of the token.

With respect to FIG. 5A, in some embodiments, the recipient mailbox 124 may be hosted by mail service 502 that does not generate authenticating tokens that are described above. It can be appreciated that FIG. 5A is similar to FIG. 1 with the exception that a passcode 504 is utilized. A passcode can be generated at the enhanced mail service 102 and communicated to the mail service 502 in a passcode message 508. In addition, the passcode 504 can be sent to the enhanced mail service 102 within a request 152. The function of the passcode 504 is similar to the function of the token 146.

In one illustrative example, as shown in the dataflow scenario of FIG. 5A, the universal mail module 130 is used to access recipient mailbox 124 from the mail service 502 to receive the message 138. The universal mail module 130 and/or the browser module 128 may be used to transmit a passcode 504 to the enhanced mail service 102. In some embodiments, the link 142 may be further configured to enable the recipient 136 to cause the recipient device 108 generate a passcode request 506. The passcode request 506 is then sent to the enhanced mail service 102 to cause the enhanced mail service to generate a passcode message 508 for transmission to the recipient mailbox 124. For example, the passcode request 506 may cause the key store 118 to generate a single use and/or time limited passcode which the recipient 136 may redeem to obtain decrypted access encrypted content 140. The universal mail module 134 may retrieve the passcode message 508 from the mail service 502 and display the passcode message 508 in line with the message 138 within a user inbox view of the universal mail module 134. The passcode message 508 may communicate the passcode 504 to the recipient 136 and/or universal mail module 134 to enable generation of the request 152. For example, the recipient 136 may be prompted to enter the passcode 504 into a field of graphical UI to generate the request 152. Alternatively, the passcode message 508 may include a link that automatically generates the HTTPS request 152 including the passcode 504. Upon receipt of the passcode 504 within the request 152, the enhanced mail service 102 may transmit the reply 154 including the decrypted content 156 in a similar manner as described with relation to FIG. 1.

Turning now to FIG. 5B, it can be appreciated that FIG. 5B is similar to FIG. 3 with the exception that the passcode 504 is sent to the enhanced mail service 102 within the get key request 310 rather than the token 146. FIG. 5B is similar to FIG. 5A with the exception that the recipient device 108 is executing an enhanced mail module 302 (e.g., Outlook) that is compatible with the enhanced mail service 102 (e.g., Office 365). For example, in the dataflow scenario of FIG. 5B, the enhanced mail module 302 is used to access recipient mailbox 124 from the mail service 502 to receive the message 138 and then either the enhanced new module 302 and/or the browser module 128 may be used to transmit a passcode 504 to the enhanced mail service. In some embodiments, the enhanced mail module 302 may be configured to automatically generate the passcode request 506 based on the message 138 and/or the link 142. For example, upon receipt of the message 138 the enhanced mail module 302 may identify and/or activate the link 142 to generate and transmit the passcode request 506. In some embodiments, the enhanced mail module 302 may be configured to automatically generate the get key request 310 including the passcode 504 based on the passcode message 508. For example, the enhanced mail module 302 may be configured to extract the passcode 504 from the passcode message 508 to generate the get key request 310. Furthermore, upon receipt of the key 312 in response to the get key request 310, the enhanced mail module 302 may be configured to automatically generate a message 138 containing the decrypted content 156 and store it in the volatile cache 308.

In various embodiments, one or more of the foregoing functionalities described with relation to the passcode message 508 and the enhanced mail module 302 may be triggered upon the user selecting the message 138. For example, upon the recipient 136 selecting the message 138 the enhanced mail module 302 may automatically generate and transmit the passcode request 506 and wait for the passcode message 508. Then upon receipt of the passcode message 508 the enhanced mail module may extract the passcode 504 to generate the get key request 310 to ultimately receive the encryption key 312 and generate the message 138 containing the decrypted content 156.

Turning now to FIG. 6, aspects are illustrated of a UI 600 that can be displayed on the recipient device 108 in association with the data flow scenario of FIG. 5A to enable the recipient 136 to cause the enhanced mail service 102 to transmit a passcode 504. As illustrated, the UI 600 may provide the recipient 136 with options to sign-in with her email service provider if listed or to request a passcode. In some embodiments, the enhanced mail service 102 may be configured to recognize a domain associated with a recipient email address to determine whether to generate the UI 600 as opposed to UI 204. For example, if the recipient email address corresponds to a domain that is known to be hosted by mail service 106 which is known to have the capability of generating the token 146, the enhanced mail service 102 may choose to display the UI 204. As a specific example, the enhanced mail service 102 may be configured to display UI 204 for email addresses associated with certain domains (e.g. Gmail™ webmail service and/or Yahoo® webmail service) as these domains may be known to deploy OAuth protocols. Furthermore, if the recipient email address corresponds to a domain that is known to not have certain authentication capabilities, e.g. is known to not deploy OAuth, then activation of the link 142 automatically generate the passcode request 506 or may provide the recipient with only one option, e.g. to request a passcode. Alternatively, if the enhanced mail service 102 cannot tell from the recipient email address whether the corresponding mail service supports OAuth protocols, then the UI 600 may be displayed upon activation of the link 142. For example, many email addresses correspond to a domain of a business website from which it is not readily determinable which email service provider hosts the recipient mailbox 124. As illustrated, in such a scenario the UI 600 may provide various options to the recipient 136 of how to obtain decrypted access of the encrypted content 140. A first such option may be to sign in with service provider that hosts the recipient mailbox 124. For example, although the enhanced mail service 102 may be unable to determine whether the email address of "Kat@domainABC.com" is hosted by Acme email services which supports a certain security protocol such as OAuth, the recipient 136 may be provided the option to "Sign in using Acme." Upon clicking "Sign in using Acme," the enhanced mail service 102 may deploy UI 204. A second such option may be to generate the past request 506 for selecting the link entitled "Send Me a Passcode."

Turning now to FIG. 7A, an example data flow scenario is illustrated of a system 700 that includes an on-premise mail service 702 in communication with the enhanced email service 102 to provide the recipient 136 with decrypted access to the encrypted content 140 that is stored in the organizational mailbox 112 at the enhanced email service 102. In some embodiments, the sender may transmit content 134 to the on-premise mail service 702. The on-premise mail service 702 may deploy encryption module 114 to encrypt the content 134 to generate the encrypted content 140. The on-premise mail service 702 may generate a message 704 that includes the encrypted content 140 and may transmit the message 704 to the enhanced mail service 102. The enhanced mail service 102 may then create the message 138 that includes the encrypted content 140 and the link 142 based upon the message 704. It can be appreciated that the system 700 is similar to the systems 100, 300, and 500 with the exception that the sender mailbox 110 is not stored on the enhanced mail service 102 in the system 700. Accordingly, any flows of data between one or more of the enhanced mail service 102, the mail service 106, the mail service 502, and/or the recipient device 108 described herein with relation to one or more of systems 100, 300, and/or 500 may equally apply to system 700. In particular, the recipient device 108 of FIG. 7 may deploy the universal mail module 130 or the enhanced mail module 302 to communicate with the enhanced mail service 102 and ultimately to obtain decrypted access of the encrypted content 140.

In some embodiments, the recipient device 108 may transmit to the enhanced mail service 102 decryption parameters 706 associated with an ability of the recipient device 108 to decrypt content locally. For example, the decryption parameters 706 may indicate whether the recipient device 108 includes decryption module 116. Then, based on the decryption parameters 706, the enhanced mail service 102 may determine whether to send an encryption key to the recipient device or to decrypt the encrypted content at the server-side and transmit decrypted content to the recipient device 108. In some embodiments, in which the universal mail module 130 and or the recipient device 108 includes decryption capabilities, the decryption parameters 706 may cause enhanced mail service 102 to transmit a key 712 rather than decrypted content 156.

In some embodiments, the enhanced mail service 102 may be configured to erase the message 138 from the organizational mailbox 112 upon providing recipient device with the decrypted access to the message 138. For example, the enhanced mail service 102 may provide to the message 138 only a single time and/or only a predetermined number of times and/or only for a predetermined window of time.

Turning now to FIG. 7B, an example data flow scenario is illustrated of a system 720 that includes an on-premise mail service 702 in communication with the enhanced email service 102 to provide the intended recipient 136 with decrypted access to encrypted content 140 via the universal mail module 130 without storing the encrypted content 140 on the enhanced mail service 102. In system 720, the enhanced mail service 102 may be configured with a data pipe 722 to route the message 704 through the enhanced mail service 102 to the recipient mailbox 124 without storing the message 704 at the enhanced mail service 102. For example, the enhanced mail service 102 may be configured to delete the message 138 subsequent to sending the message 138 recipient mailbox 124 so that a copy of the message 138 is not stored by the enhanced mail service 102 upon receiving a request for decrypted access and/or a token 146 from the recipient device 108. The recipient device 108 may then deploy the universal mail module 130 to receive a copy of the message 704.

In such embodiments, in order to obtain access to the decrypted content 156, the universal mail module 130 may generate an HTTPS request 724 that is similar to the HTTPS request 152 except that it includes the encrypted content 140 in addition to the token 146 and/or the passcode 504. Transmitting the encrypted content 140 back to the enhanced mail service 102 may be desirable in embodiments where the encrypted content is not stored locally at the enhanced mail service 102, e.g. in implementations lacking the organizational mailbox 112. Upon authenticating the recipient device 108 with respect to the recipient mailbox 124, the enhanced mail service 102 may decrypt the encrypted content 140 to generate decrypted content 156 that is sent to the recipient device 108 within the HTTPS reply 154. The decrypted content 156 can be displayed on a web browser.

Turning now to FIG. 7C, an example data flow scenario is illustrated of system 740 that is that similar to that of FIG. 7B except where the enhanced email service 102 provides the recipient 136 with decrypted access to encrypted content 140 via the enhanced mail module 302 (e.g., Outlook) without storing the encrypted content 140 at the enhanced email service 102. As shown, in some embodiments the enhanced email service 102 does not contain an organizational mailbox. As illustrated in FIG. 7C, the enhanced mail module 302 may generate a get key request 310 including the token 146 in a similar manner as described with relation to FIG. 3. It can be appreciated that systems 720 and 740 are similar to the systems 100, 300, and 500 with the exception that the organizational mailbox 112 is not used to store the message 138 and/or the content 140 on the enhanced mail service 102 in systems 720 and 740. Accordingly, any flows of data between one or more of the enhanced mail service 102, the mail service 106, the mail service 502, and/or the recipient device 108 described herein with relation to one or more of systems 100, 300, and/or 500 may equally apply to systems 720 and/or 740. The main distinction between these systems is that when the encrypted content 140 is not stored on the enhanced mail service 102, the enhanced mail service 102 is to be used to decrypt the encrypted content 140 only when the encrypted content 140 is sent back to the enhanced mail service 102 with a token from the recipient device 108.

Turning now to FIG. 8, an example data flow scenario is illustrated of a system 800 in which the enhanced mail service 102 provides a version of the message 138 containing the decrypted content 156 to the recipient mailbox 124 based on the recipient mailbox 124 being associated with a predetermined domain 802 that corresponds to predetermined domains data 804 stored at the enhanced mail service 102. In some embodiments, the predetermined domains data 804 may list a plurality of domains that are associated with the enhanced mail service 102. For example, predetermined domain 802 may include a mail service 806 that is associated with or backed by enhanced mail service 102. In some embodiments, the mail service 806 may be configured to follow various rules with respect to the message 138 containing, and configured to display, the decrypted content 156. Exemplary such rules include, but are not limited to, permissions associated with forwarding the version of the message 138 containing the decrypted content 156. Accordingly, upon the recipient 136 attempting to send a forwarded message 808 that may be a forwarded copy of the version of the message 138 containing the decrypted content 156 the mail service 806 may refrain from forwarding the message as requested by the recipient 136. In some embodiments, the enhanced mail service 102 may be configured to receive transmission restriction data associated with particular content and/or a particular organization and to permit and/or deny requests for actions associated with the version of the message 138 containing the decrypted content 156 based upon the transmission restriction data. For example, the transmission restriction data may permit and/or restrict the recipient 136 from forwarding and/or saving and/or printing the version of the message 138 containing the decrypted content 156.

In some embodiments, the mail service 806 may be an all or in part hosted by the enhanced mail service 102. For example, the enhanced mail service 102 may be deployed to host mailboxes associated with business owned domains such that the mail service 806 is a sub part of the enhanced mail service 102 that is configured to provide "username@yourbusinessdomainhere.com" type email addresses. As a specific example, the enhanced mail service 102 may correspond to an email service provided Microsoft Office 365 and the mail service 806 may be associated with and/or also hosted by Microsoft Office 365 to host the recipient mailbox associated with the hypothetical email address "Kat@EngineeringFirm.com" where EnginerringFirm.com is a domain owned by Kat's employer. In some embodiments, the enhanced mail service 102 may be configured to determine whether it hosts or is otherwise associated with the recipient mailbox 124. Then, based on a determination that the enhanced mail service 102 does host or is associated with the recipient mailbox 124, the enhanced mail service 102 may choose to send an unencrypted version of the content 134 to the recipient mailbox 124. For example, the enhanced mail service 102 may choose to transmit the message 138 displaying the decrypted content 156 directly to the recipient mailbox 134. In contrast, a determination that the enhanced mail service 102 does not host the recipient mailbox 124 may cause the enhanced mail service to refrain from transmitting unencrypted content to the recipient mailbox 124 but rather to provide the decrypted access as described with respect to, for example, FIGS. 1 & 3.

FIG. 9 is a flow diagram of an illustrative process 900 of selecting between various decryption methods based upon whether decrypted access is requested by a universal mail module or an enhanced mail module. The process 900 is described with reference to FIGS. 1-8. The process 900 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process.

At block 901, a system may receive encrypted content that is configured according to an encryption key. In some implementations, the encrypted content may be received from a sender device having been already encrypted. For example, a sender device may include an encryption module and a sender may cause the encryption module to encrypt content according to the encryption key to generate the encrypted content. Then, the sender device may transmit the encrypted content a long with the encryption key to the enhanced mail service. In some implementations, the encrypted content may be encrypted by an encryption module at the enhanced mail service. For example, a sender device may transmit the content in an unencrypted format to the enhanced mail service. Then, the enhanced mail service may deploy the encryption module to encrypt the received content according to an encryption key. In some implementations, the enhanced mail service may store the encryption key in a key store.

At block 903, the system may generate a message that includes the encrypted content and a link to enable decrypted access to the encrypted content. In some implementations, the message may be an email message that includes the encrypted content as an email attachment and further includes the link within a message body of the email message. For example, the encrypted content may come in the form of an encrypted file that is attached to an email message. The message may further designate a recipient email address to enable transmission of the message to the recipient mailbox via one or more standard email transmission protocols.

At block 905, the system may transmit the message to an intended recipient's mailbox. In some implementations, the recipient mailbox may be operated by a recipient mail service that provides access to the recipient mailbox upon the intended recipient providing recipient credentials that are associated with the recipient email address. For example, the intended recipient may provide her recipient credentials to the recipient mail service via a web browser portal and, in return, the recipient mail service may serve back an HTTPS webpage to provide access to the recipient mailbox.

At block 907, the system may receive a request that includes a token and/or the passcode associated with the recipient's mailbox. For example, as discussed with relation to FIG. 1, the recipient device may transmit an HTTPS request that contains the token to the enhanced mail service from a universal mail module. As another example, as discussed with relation to FIG. 5A, the recipient device may transmit to the enhanced mail service an HTTPS request that contains a passcode received via a passcode message sent in response to a passcode request. As yet another example, as discussed with relation to FIGS. 3 and 5B, the recipient device may transmit from an enhanced mail module a get key request that includes the token and/or a passcode that is received via a passcode message.

Upon receiving a request that includes the token and/or the passcode and, ultimately, authenticating the token and/or passcode with respect to the recipient's mailbox, the system may then proceed to decision blocks 909 and/or 917.

At block 909, the system may determine whether the token and/or passcode has been received from a universal mail module.

If the system determines that the token and/or passcode has been received from universal mail module, the process 900 may proceed from block 909 to block 911 at which the system may obtain access a key store to obtain an encryption key that corresponds to the encrypted content. Then, at block 913 the system may deploy a decryption module and the encryption key to decrypt the encrypted content into corresponding decrypted content. Ultimately, the system may generate a reply message for transmission to the universal mail module that includes the decrypted content.

At block 915, the system may transmit to the recipient device the reply message that includes the decrypted content. In some implementations, the reply message may be transmitted to the recipient device via an HTTPS reply that includes the decrypted content. The HTTPS reply may be in an encrypted format that is configured to be displayed via a secure web browser module.

If the system determines that the token and/or passcode has not been received from a universal mail module, the process 900 may from block 909 to block 917 at which the system may determine whether the token and/or passcode has been received from an enhanced mail module. If the token and/or passcode has been received from an enhanced mail module, the process 900 may proceed from block 917 to block 911(D) which is a duplicate of block 911. In particular, at block 911(D), the system may obtain access to a key store to obtain the encryption key that corresponds to the encrypted content. Ultimately, the system may generate a reply message for transmission to the enhanced mail module that includes the encryption key.

Then, at block 919, the system may transmit to the recipient device the reply message that includes the encryption key to enable the enhanced mail module to locally decrypt the encrypted content.

As indicated by block 921, in the event that the system receives a token and/or passcode associated with the recipient mailbox but determines that the token and/or passcode has not been received from either of the universal mail module and or the enhanced mail module the process 900 may terminate without the system transmitting either the encryption key or the decrypted content.

FIG. 10 shows additional details of an example computer architecture 900 for a computer capable of executing the enhanced mail service 102, and/or enhanced mail module 302, and/or any program components thereof as described herein. Thus, the computer architecture 900 illustrated in FIG. 10 illustrates an architecture for a server computer, or network of server computers, a desktop computer, a laptop computer, a tablet computer, a smart phone, or any other types of computing devices suitable for implementing the functionality described herein. The computer architecture 900 may be utilized to execute any aspects of the software components presented herein.

The computer architecture 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system containing the basic routines that help to transfer information between elements within the computer architecture 1000, such as during startup, is stored in the ROM 1008. The computer architecture 1000 further includes a mass storage device 1012 for storing an operating system 1014, other data, and one or more application programs. The mass storage device 1012 may further include one or more of the enhanced mail service 102, and/or enhanced mail module 302.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1000. For purposes the claims, the phrase "computer storage medium," "computer-readable storage medium" and variations thereof, does not include waves, signals, and/or other transitory and/or intangible communication media, per se.

According to various configurations, the computer architecture 1000 may operate in a networked environment using logical connections to remote computers through a network 1050 and/or another network (not shown). The computer architecture 1000 may connect to the network 1050 through a network interface unit 1016 connected to the bus 1010. It should be appreciated that the network interface unit 1016 also may be utilized to connect to other types of networks and remote computer systems. The computer architecture 1000 also may include an input/output controller 1018 for receiving and processing input from a number of other devices, including a keyboard, mouse, or electronic stylus (not shown in FIG. 10). Similarly, the input/output controller 1018 may provide output to a display screen, a printer, or other type of output device (also not shown in FIG. 10). It should also be appreciated that via a connection to the network 1050 through a network interface unit 1016, the commuting architecture may enable enhanced communication service 102 to communicate with one or more of the sender device 104, the on-premise mail service 702, the mail service 106, the mail service 502, and/or the recipient mail device 108. It should also be appreciated that via a connection to the network 1050 through a network interface unit 1016, the commuting architecture may enable enhanced email module 302 to communicate with one or more of the sender device 104, the on-premise mail service 702, the enhanced mail service 102, the mail service 106, and/or the mail service 502.

It should be appreciated that the software components described herein may, when loaded into the CPU 1002 and executed, transform the CPU 1002 and the overall computer architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 may include other types of computing devices, including hand-held computers, embedded computer systems, personal digital assistants, and other types of computing devices known to those skilled in the art. It is also contemplated that the computer architecture 1000 may not include all of the components shown in FIG. 10, may include other components that are not explicitly shown in FIG. 10, or may utilize an architecture completely different than that shown in FIG. 10.

EXAMPLE CLAUSES

The disclosure presented herein may be considered in view of the following clauses.

Example Clause A, a computer-implemented method for providing an enhanced email service, the method comprising: receiving encrypted content that is configured according to an encryption key; generating a message that designates a recipient email address, wherein the message includes at least the encrypted content as an attachment, and a link to enable decryption of the encrypted content based on the encryption key; sending the message to a recipient mailbox operated by a recipient mail service, the recipient mailbox accessible based on recipient credentials associated with the recipient email address; storing, by the enhanced email service, at least one of the message or an unencrypted version of the message in a sender mailbox that corresponds to a sender email address, the sender mailbox accessible based on sender credentials associated with the sender email address; and storing, by the enhanced email service, the message in an organizational mailbox, the organizational mailbox being addressable from a recipient device by use of the link, wherein the organizational mailbox is not accessible based on the sender credentials.

Example Clause B, the computer-implemented method of Example Clause A, wherein the organizational mailbox and the sender mailbox are hosted by the enhanced email service in a first domain, and wherein the recipient mailbox is hosted by the recipient mail service in a second domain.

Example Clause C, the computer-implemented method of any of Example Clauses A through B, wherein the link is configured to expose an authentication module of the recipient mail service hosted in the second domain to enable the recipient device to obtain a token from the recipient mail service to associate with the first domain.

Example Clause D, the computer-implemented method of any of Example Clauses A through C, further comprising: receiving authentication data from the recipient mail service; determining, based on the authentication data, whether a token that is received from the recipient device is authentic with respect to the recipient email address; and based on a determination that the token is authentic with respect to the recipient email address, transmitting, to the recipient device, at least one of the encryption key or a reply containing decrypted content generated from the encrypted content and the key.

Example Clause E, the computer-implemented method of any of Example Clauses A through D, wherein the link enables a mail module, that is operating on the recipient device to provide access to the recipient mailbox, to automatically transmit a token provided by the recipient mail service to the enhanced email service.

Example Clause F, the computer-implemented method of any of Example Clauses A through E, the method further comprising: receiving, from the mail module, a request that includes the token in association with the recipient email address; transmitting, to the mail module, the encryption key to enable the mail module to decrypt the encrypted content to display a decrypted version of the content.

Example Clause G, the computer-implemented method of any of Example Clauses A through F, wherein the link is usable at the recipient device to cause the enhanced email service to transmit a passcode message that includes a volatile passcode, the method further comprising: receiving, from the recipient device, a request that includes the volatile passcode; transmitting, to the recipient device, at least one of the encryption key or decrypted content.

Example Clause H, the computer-implemented method of any of Example Clauses A through G, wherein the receiving the encrypted content comprises: receiving content from a mail module of a sender device; and encrypting the content to generate the encrypted content according to the encryption key.

While Example Clauses A through H are described above with respect to a method, it is understood in the context of this document that the subject matter of Example Clauses A through H can also be implemented by a device, by a system, and/or via computer-readable storage media.

Example Clause I, a system for providing an enhanced email service, the system comprising: a processor; and a memory in communication with the processor, the memory having computer-readable instructions stored thereupon that, when executed by the processor, cause the processor to perform operations comprising: receiving encrypted content that is configured according to an encryption key; generating a message that includes a link and the encrypted content that is configured according to the encryption key, wherein the message designates a recipient email address; storing the message in an organizational mailbox that is addressable from a recipient device by use of the link; storing the encryption key in a key store, wherein the key store is configured to provide access to the encryption key by the use of a token; sending the message to a recipient mailbox corresponding to the recipient email address; receiving the token from the recipient device; and providing the recipient device with decrypted access to the encrypted content upon verifying that the token is authentic with respect to the recipient email address.

Example Clause J, the system of Example Clause I, wherein providing the recipient device with decrypted access to the encrypted content comprises sending the encryption key to the recipient device to enable a decryption module of the recipient device to locally decrypt the encrypted content.

Example Clause K, the system of any of Example Clauses I through J, further comprising receiving an indication of decryption parameters associated with the recipient device, and wherein providing the recipient device with decrypted access to the encrypted content comprises: determining, based on the decryption parameters, whether to send the encryption key to the recipient device or to decrypt the encrypted content to generate decrypted content to send to the recipient device.

Example Clause L, the system of any of Example Clauses I through K, further comprising erasing the message from the organizational mailbox upon providing the recipient device with the decrypted access to the message.

Example Clause M, the system of any of Example Clauses I through L, wherein receiving the encrypted content includes receiving a sender-originated message from a sender mail service that includes the encrypted content and the encryption key, and wherein generating the message includes extracting the encryption key from the sender-originated message and generating the link to provide access to the encryption key based on the token.

Example Clause N, the system of any of Example Clauses I through M, wherein the organizational mailbox is hosted in a first domain and the recipient mailbox is hosted in a second domain, and wherein the link is configured to open a webpage that exposes an authentication module associated with the second domain to the first domain to authenticate the recipient device with respect to the recipient email address.

Example Clause O, the system of any of Example Clauses I through N, further comprising deleting the message subsequent to the sending the message to the recipient mailbox and prior to the receiving the token from the recipient device.

While Example Clauses I through O are described above with respect to a system, it is understood in the context of this document that the subject matter of Example Clauses I through O can also be implemented by a device, via a computer-implemented method, and/or via computer-readable storage media.

Example Clause P, a system for delivery of messages, the system comprising: a processor; and a memory in communication with the processor, the memory having computer-readable instructions stored thereupon that are executable by the processor to: receive encrypted content that is configured according to an encryption key; generate a message that includes a link and the encrypted content that is configured according to the encryption key, wherein the message designates a recipient email address, and wherein the message further designates a sender email address associated with a sender mail service; send, at a first time, the message to a recipient mailbox corresponding to the recipient email address; store, in an organizational mailbox of an enhanced email service, the encryption key in association with the recipient email address, wherein the organizational mailbox is different than a sender mailbox corresponding to the sender email address; and receive, at a second time that is subsequent to the first time, a request from a recipient device for decrypted access to the content, wherein the request includes a token provided by a mail service, the token to verify an authenticity of the request with respect to the recipient email address, wherein the encrypted content is not stored in the organizational mailbox at the second time.

Example Clause Q, the system of Example Clause P, wherein the instructions are further executable by the processor to: receive the encrypted content from the recipient device is association with the request; decrypt, based on the encryption key, the encrypted content to generate decrypted content; and send the decrypted content to the recipient device.

Example Clause R, the system of any of Example Clauses P through Q, wherein the organizational mailbox is hosted in a first domain and the recipient mailbox is hosted in a second domain, and wherein the request for decrypted access to the content is automatically generated by a mail module that is operating locally on the recipient device and is configured to automatically communicate recipient credentials to the mail service.

Example Clause S, the system of any of Example Clauses P through R, wherein receiving the encrypted content includes receiving a sender-originated first message that designates the sender email address and the recipient email address.

While Example Clauses P through S are described above with respect to a system, it is understood in the context of this document that the subject matter of Example Clauses P through S can also be implemented by a device, via a computer-implemented method, and/or via computer-readable storage media.

Example Clause T, a computer-implemented method for providing an enhanced email service, the method comprising: receiving, at the enhanced email service, content that is designated for transmission to a recipient email address that corresponds to a recipient mailbox, wherein the enhanced email service is associated with a predetermined domain; determining whether the enhanced email service hosts the recipient mailbox; and based on a determination that the enhanced email service does host the recipient mailbox: sending an unencrypted version of the content to the recipient mailbox; or based on a determination that the enhanced email service does not host the recipient mailbox: sending an encrypted version of the content to the recipient mailbox as an attachment to a message that includes a link to enable decryption of the encrypted version, storing at least one of the encrypted version of the content or the encryption key in an organizational mailbox that is addressable from a recipient device by use of the link; receiving a token from the recipient device; and providing the recipient device with decrypted access to the content upon verifying that the token is authentic with respect to the recipient email address.

Example Clause U, the computer-implemented method of Example Clause T, wherein the enhanced email service does host the recipient mailbox, the operations further comprising: receiving transmission restriction data associated with the content; and denying, based on the transmission restriction data, a request to forward the unencrypted version of the content from the recipient mailbox.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for providing an enhanced email service, the method comprising:
   receiving encrypted content that is configured according to an encryption key;
   generating a message that designates a recipient email address and a sender email address, wherein the message includes at least the encrypted content as an attachment, and a link to enable decryption of the encrypted content based on the encryption key;
   sending the message to a recipient mailbox operated by a recipient mail service, the recipient mailbox accessible based on recipient credentials associated with the recipient email address;
   storing, by the enhanced email service, at least one of the message that designates the recipient email address and the sender email address or an unencrypted version of the message in a sender mailbox that corresponds to the sender email address, the sender mailbox accessible based on sender credentials associated with the sender email address; and
   storing, by the enhanced email service, the message that designates the recipient email address and the sender email address in an organizational mailbox that is different than the sender mailbox, the organizational mailbox being addressable from a recipient device by use of the link, wherein the organizational mailbox is not accessible based on the sender credentials.

2. The computer-implemented method of claim 1, wherein the organizational mailbox and the sender mailbox are hosted by the enhanced email service in a first domain, and wherein the recipient mailbox is hosted by the recipient mail service in a second domain.

3. The computer-implemented method of claim 2, wherein the link is configured to expose an authentication module of the recipient mail service hosted in the second domain to enable the recipient device to obtain a token from the recipient mail service to associate with the first domain.

4. The computer-implemented method of claim 1, further comprising:
   receiving authentication data from the recipient mail service;
   determining, based on the authentication data, whether a token that is received from the recipient device is authentic with respect to the recipient email address; and
   based on a determination that the token is authentic with respect to the recipient email address, transmitting, to the recipient device, at least one of the encryption key or a reply containing decrypted content generated from the encrypted content and the key.

5. The computer-implemented method of claim 1, wherein the link enables a mail module, that is operating on the recipient device to provide access to the recipient mailbox, to automatically transmit a token provided by the recipient mail service to the enhanced email service.

6. The computer-implemented method of claim 5, the method further comprising:
   receiving, from the mail module, a request that includes the token in association with the recipient email address;
   transmitting, to the mail module, the encryption key to enable the mail module to decrypt the encrypted content to display a decrypted version of the content.

7. The computer-implemented method of claim 1, wherein the link is usable at the recipient device to cause the enhanced email service to transmit a passcode message that includes a volatile passcode, the method further comprising:
   receiving, from the recipient device, a request that includes the volatile passcode;
   transmitting, to the recipient device, at least one of the encryption key or decrypted content.

8. The computer-implemented method of claim 1, wherein the receiving the encrypted content comprises:
   receiving content from a mail module of a sender device; and
   encrypting the content to generate the encrypted content according to the encryption key.

9. A system for providing an enhanced email service, the system comprising:
   a processor; and
   a memory in communication with the processor, the memory having computer-readable instructions stored thereupon that, when executed by the processor, cause the processor to perform operations comprising:
      receiving encrypted content that is configured according to an encryption key;
      generating, in association with a sender email address, a message that includes a link and the encrypted content that is configured according to the encryption key, wherein the message designates a recipient email address;
      storing the message in an organizational mailbox that is addressable from a recipient device by use of the link, wherein the organizational mailbox is different than a sender mailbox corresponding to the sender email address;
      storing the encryption key in a key store, wherein the key store is configured to provide access to the encryption key by the use of a token;
      sending the message to a recipient mailbox corresponding to the recipient email address;
      receiving the token from the recipient device; and providing the recipient device with decrypted access to the encrypted content upon verifying that the token is authentic with respect to the recipient email address.

10. The system of claim 9, wherein providing the recipient device with decrypted access to the encrypted content comprises sending the encryption key to the recipient device to enable a decryption module of the recipient device to locally decrypt the encrypted content.

11. The system of claim 9, further comprising receiving an indication of decryption parameters associated with the recipient device, and wherein providing the recipient device with decrypted access to the encrypted content comprises:
determining, based on the decryption parameters, whether to send the encryption key to the recipient device or to decrypt the encrypted content to generate decrypted content to send to the recipient device.

12. The system of claim 9, further comprising erasing the message from the organizational mailbox upon providing the recipient device with the decrypted access to the message.

13. The system of claim 9, wherein receiving the encrypted content includes receiving a sender-originated message from a sender mail service that includes the encrypted content and the encryption key, and wherein generating the message includes extracting the encryption key from the sender-originated message and generating the link to provide access to the encryption key based on the token.

14. The system of claim 9, wherein the organizational mailbox is hosted in a first domain and the recipient mailbox is hosted in a second domain, and wherein the link is configured to open a webpage that exposes an authentication module associated with the second domain to the first domain to authenticate the recipient device with respect to the recipient email address.

15. The system of claim 9, further comprising deleting the message subsequent to the sending the message to the recipient mailbox and prior to the receiving the token from the recipient device.

16. A system for delivery of messages, the system comprising:
a processor; and
a memory in communication with the processor, the memory having computer-readable instructions stored thereupon that are executable by the processor to:
receive encrypted content that is configured according to an encryption key;
generate a message that includes a link and the encrypted content that is configured according to the encryption key, wherein the message designates a recipient email address, and wherein the message further designates a sender email address associated with a sender mail service;
send, at a first time, the message to a recipient mailbox corresponding to the recipient email address;
store, in an organizational mailbox of an enhanced email service, the encryption key in association with the recipient email address, wherein the organizational mailbox is different than a sender mailbox corresponding to the sender email address; and
receive, at a second time that is subsequent to the first time, a request from a recipient device for decrypted access to the content, wherein the request includes a token provided by a mail service, the token to verify an authenticity of the request with respect to the recipient email address, wherein the encrypted content is not stored in the organizational mailbox at the second time.

17. The system of claim 16, wherein the instructions are further executable by the processor to:
receive the encrypted content from the recipient device is association with the request;
decrypt, based on the encryption key, the encrypted content to generate decrypted content; and
send the decrypted content to the recipient device.

18. The system of claim 16, wherein the instructions are further executable by the processor to:
delete the message from the organizational mailbox upon providing the recipient device with the decrypted access to the message.

19. The system of claim 16, wherein the organizational mailbox is hosted in a first domain and the recipient mailbox is hosted in a second domain, and wherein the request for decrypted access to the content is automatically generated by a mail module that is operating locally on the recipient device and is configured to automatically communicate recipient credentials to the mail service.

20. The system of claim 16, wherein receiving the encrypted content includes receiving a sender-originated first message that designates the sender email address and the recipient email address.

* * * * *